US012222702B2

(12) United States Patent
Roy et al.

(10) Patent No.: US 12,222,702 B2
(45) Date of Patent: Feb. 11, 2025

(54) MODULATING POOL OR SPA HEATER SYSTEMS AND ASSOCIATED METHODS

(71) Applicant: Hayward Industries, Inc., Charlotte, NC (US)

(72) Inventors: William Julian Roy, Thompson's Station, TN (US); Troy Renken, Mooresville, NC (US)

(73) Assignee: Hayward Industries, Inc., Charlotte, NC (US)

( * ) Notice: Subject to any disclaimer, the term of this patent is extended or adjusted under 35 U.S.C. 154(b) by 275 days.

(21) Appl. No.: 17/832,454

(22) Filed: Jun. 3, 2022

(65) Prior Publication Data
US 2022/0390924 A1 Dec. 8, 2022

Related U.S. Application Data

(60) Provisional application No. 63/196,617, filed on Jun. 3, 2021.

(51) Int. Cl.
*G05B 19/41* (2006.01)
*A61H 33/00* (2006.01)
(Continued)

(52) U.S. Cl.
CPC ........ *G05B 19/4155* (2013.01); *A61H 33/005* (2013.01); *A61H 33/063* (2013.01); *G05B 2219/50333* (2013.01)

(58) Field of Classification Search
None
See application file for complete search history.

(56) References Cited

U.S. PATENT DOCUMENTS 6,246,831 B1 * 6/2001 Seitz .................... F24H 15/174
219/483
7,874,808 B2 1/2011 Stiles
(Continued)

FOREIGN PATENT DOCUMENTS

EP 2372260 B1 5/2016

OTHER PUBLICATIONS

AO Smith®, Commercial Gas Water Heaters, Models BTH 300(A)/400(A)/500(A), Series 300 & 301, Instruction Manual, marked copyright 2016 (76 pages).
(Continued)

*Primary Examiner* — Mohammad Ali
*Assistant Examiner* — Kelvin Booker
(74) *Attorney, Agent, or Firm* — McCarter & English, LLP

(57) ABSTRACT

A modulating heater system for a pool or spa includes a pool or spa heater capable of variably modulating energy output thereof and a controller communicatively coupled thereto. The controller determines a predicted load based on a previous load, ambient and water temperatures, and estimated pool/spa size, and determines an overshoot setpoint for an operational mode. The controller establishes a target temperature setpoint for the mode and receives a current water temperature. The controller determines whether the overshoot setpoint plus target temperature setpoint is greater than the current water temperature, and determines an error based thereon. The controller determines if the error is less than or greater than a target for the mode, and, based on this determination, determines a heater modulation rate for the mode taking into account the mode, maximum heater output, and available fuel supply. The controller controls the heater to operate at the determined modulation rate.

1 Claim, 16 Drawing Sheets

(51) Int. Cl.
  *G05B 19/4155* (2006.01)
  *A61H 33/06* (2006.01)

(56) References Cited

U.S. PATENT DOCUMENTS

| | | | |
|---|---|---|---|
| 8,043,070 B2 | 10/2011 | Stiles, Jr. et al. | |
| 8,370,001 B2* | 2/2013 | Love | G05D 23/19 |
| | | | 700/282 |
| 8,465,262 B2 | 6/2013 | Stiles, Jr. et al. | |
| 8,971,694 B2 | 3/2015 | Deivasigamani et al. | |
| 9,063,551 B2 | 6/2015 | Deivasigamani et al. | |
| 10,018,366 B2 | 7/2018 | Deivasigamani et al. | |
| 10,240,606 B2 | 3/2019 | Stiles, Jr. et al. | |
| 10,527,042 B2 | 1/2020 | Stiles, Jr. et al. | |
| 10,947,981 B2 | 3/2021 | Stiles | |
| 2003/0061004 A1 | 3/2003 | Discenzo | |
| 2009/0132066 A1* | 5/2009 | Hollaway | A61H 33/005 |
| | | | 700/83 |
| 2009/0204263 A1* | 8/2009 | Love | G05D 23/19 |
| | | | 700/282 |
| 2017/0071821 A1* | 3/2017 | Laflamme | H04W 4/80 |
| 2017/0209338 A1* | 7/2017 | Potucek | H04L 43/0817 |
| 2017/0215261 A1* | 7/2017 | Potucek | B25J 9/161 |
| 2017/0314282 A1* | 11/2017 | Nix | C02F 1/008 |
| 2018/0163993 A1 | 6/2018 | Goodjohn et al. | |
| 2018/0174207 A1* | 6/2018 | Potucek | G06Q 50/08 |
| 2018/0224822 A1* | 8/2018 | Potucek | G05B 19/042 |
| 2018/0240322 A1* | 8/2018 | Potucek | E04H 4/14 |
| 2020/0016029 A1* | 1/2020 | Guilfoyle | A61H 33/0095 |
| 2020/0319621 A1* | 10/2020 | Roy | G01L 19/086 |
| 2021/0102712 A1* | 4/2021 | Deivasigamani | F24D 17/0068 |
| 2021/0108643 A1 | 4/2021 | Stiles, Jr. et al. | |
| 2021/0164477 A1 | 6/2021 | Stiles, Jr. et al. | |
| 2021/0190372 A1* | 6/2021 | Montanez | F24H 15/144 |
| 2022/0107614 A1* | 4/2022 | Pleva | G05B 19/042 |
| 2023/0090852 A1* | 3/2023 | Roy | E04H 4/129 |
| | | | 4/493 |

OTHER PUBLICATIONS

Lochinvar®, Crest Condensing Boiler with RealTime O2 TrimTM, Models: 1000-6000, Series: 100, Installation & Operation Manual, Rev. B, marked Oct. 2021. (72 pages).

Lochinvar®, Knight® Heating Boiler, Models: 80-285, Service Manual, KB-SER-08, marked Apr. 2010 (44 pages).

PVI Industries®, Conquest® Water Heater with EOS (Electronic Operating System) Models (20, 25, 30) L 100 A-GCL, Installation & Maintenance Manual, marked Nov. 2018 (62 pages).

Raypak®, X94 Professional Gas-Fired Pool & Spa Heater, Low NOx Model SR-410, Installation and Operation Manual, Rev. 3, marked effective: Feb. 5, 2021 (52 pages).

Raypak®, X94 Professional High Efficiency Pool and Spa Heater, Brochure, 6200.30C, marked effective Nov. 15, 2018 (8 pages).

Viessman®, Vitocrossal 300 CA3 Series 2.5, 3.0, 3.5, 4.0, 5.0 and 6.0, Installation and Service Instructions, marked May 2019 (252 pages).

Intellihot, "Dynamic Response Technology", blog post by Amy Turner published Apr. 1, 2022, archived at https://web.archive.org/web/20220930003754/https://intellihot.com/dynamic-response-technology/ (5 pages).

PCT International Search Report and Written Opinion dated Mar. 14, 2024, issued in connection with Int'l App. No. PCT/US23/80791 (8 pages).

\* cited by examiner

MODULATING POOL OR SPA HEATER SYSTEMS AND ASSOCIATED METHODS

CROSS-REFERENCE TO RELATED APPLICATIONS

The present application claims the benefit of priority to U.S. Provisional Patent Application No. 63/196,617, filed on Jun. 3, 2021, the entire disclosure of which is expressly incorporated by reference herein in its entirety.

BACKGROUND

Technical Field

The present disclosure relates to modulating pool or spa heater systems and associated methods and, in particular, to modulating pool or spa heater systems having enhanced adaptability to various pool or spa conditions, optimized energy usage characteristics, and enhanced safety features.

Background

Swimming pools and spas use various types of heaters, such as gas-fired heaters running on natural gas ("NG") or liquefied petroleum ("LP") gas, for heating the water being circulated in the pool or spa. A gas-fired pool or spa heater can be controlled to variably alter the energy or heat output thereof as a percentage of the heater's maximum capacity and can include a plurality of control and/or performance features, such as proportional-integral-derivative ("PID") tuning. Additionally, modulation is a known technique that allows a heater to control the heat capacity of a heater as needed.

However, it is desirable for a modulating heater to differentiate between modes of pool or spa operation (e.g., "silent mode," "green mode," etc.) and alter modulation based thereon, account for changes in water temperature in order to provide more complete diagnostics and optimize energy usage, and adequately control the modulation rate to avoid unnecessarily long heating times and/or energy requirements. Accordingly, what is needed is a modulating heater system that automatically and efficiently adjusts the modulation of a modulating heater to provide enhanced adaptability to various pool or spa conditions, integration with a plurality of modes of operation, optimized energy usage characteristics, and enhanced safety features. Accordingly, the systems and methods disclosed herein solve these and other needs.

SUMMARY

The present disclosure relates modulating heater systems for a pool or spa and associated methods.

According to one aspect of the present disclosure, a modulating heater system for a pool or spa is provided. The modulating heater system includes a pool or spa heater in fluidic communication with water of a pool or spa, and a controller communicatively coupled to the pool or spa heater. The heater is capable of variably modulating energy output thereof to heat the water of the pool or spa. The controller determines a predicted load based on a previous load, a current ambient temperature, a current water temperature, and an estimated pool or spa size, and determines a temperature overshoot setpoint for a mode of operation. The controller also establishes a target water temperature setpoint for the pool or spa water for the mode of operation and receives a current water temperature of the pool or spa water from a temperature sensor. Additionally, the controller determines whether the temperature overshoot setpoint for the mode of operation plus the target water temperature setpoint for the mode of operation is greater than the current water temperature. The controller also determines an error value based on the temperature overshoot setpoint for the current mode of operation, the target water temperature setpoint for the current mode of operation, and the current water temperature. In this regard, the error value is determined as the temperature overshoot setpoint plus the target water temperature setpoint minus the current water temperature. The controller determines if the error value is less than a target value for the mode of operation. If the error value is determined to be less than the target value, then the controller determines a first modulation rate for the pool or spa heater for the mode of operation. In this regard, the first modulation rate is determined based at least on the mode of operation. If the error value is determined to be greater than the target value, then the controller determines a second modulation rate for the pool or spa heater for the mode of operation. In this regard, the second modulation rate is a maximum modulation rate that is determined based on a maximum output of the pool or spa heater, an available fuel supply, and the mode of operation. The controller also controls the pool or spa heater to operate at one of the first modulation rate and the second modulation rate.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to modulating pool or spa heater systems and associated methods for optimized heating and operation of pool and spa environments, as described in detail below in connection with FIGS. 1-15.

Figure 1:
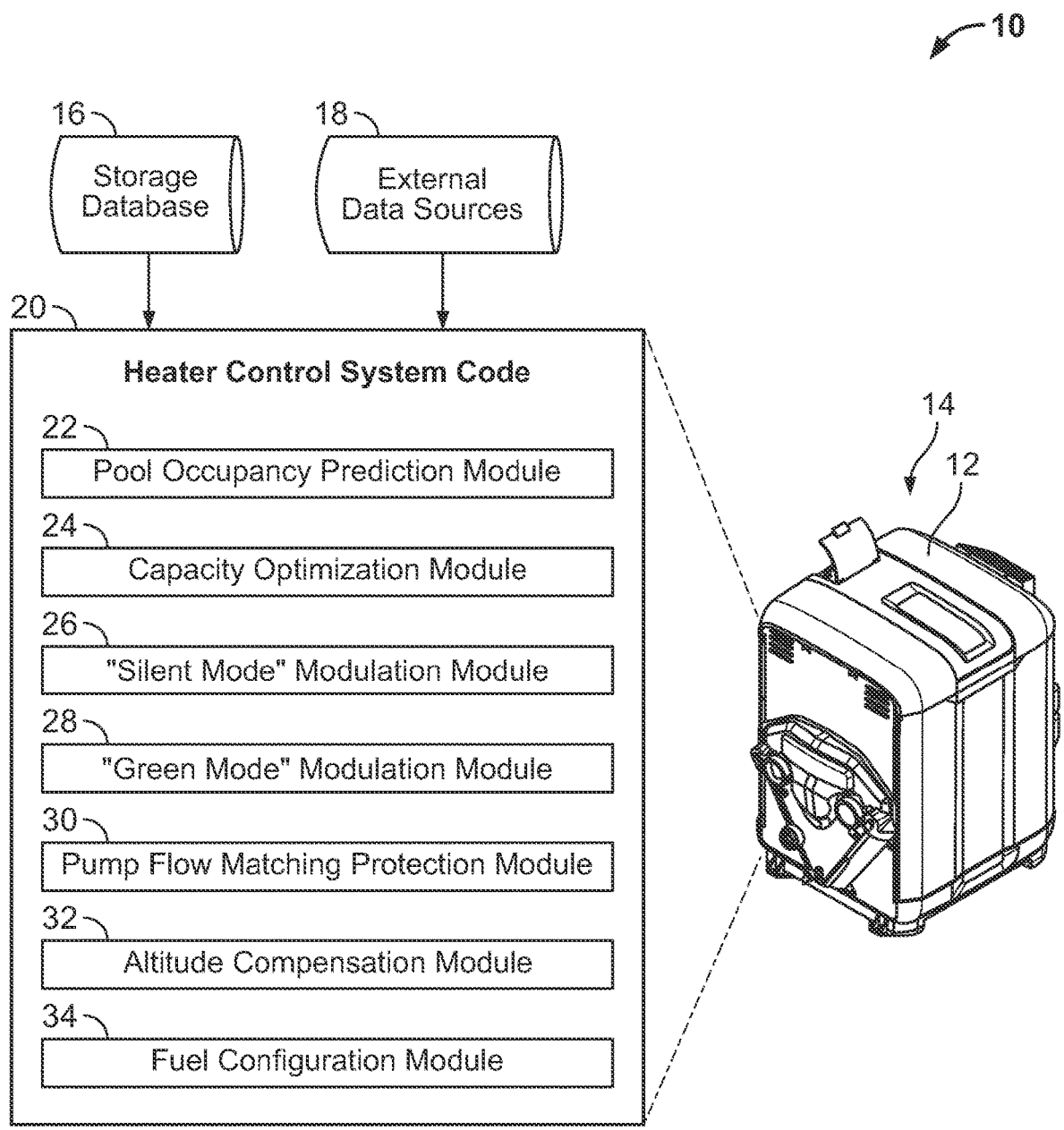
FIG. 1 is a diagram illustrating a modulating pool or spa heater system of the present disclosure.

FIG. 1 is a diagram illustrating hardware and software components of the modulating pool or spa heater system (hereinafter "system 10") of the present disclosure. The system 10 could be embodied as a central processing unit 12 (e.g., a hardware processor) that is coupled to a gas-fired pool or spa modulating heater 14 and can execute system code that determines a modulation rate for the heater 14. The central processing unit 12 can also be coupled to one or more storage databases 16 and one or more external data sources 18 (e.g., sensors, other pool or spa components, networks, etc.). As described herein, the modulating pool or spa heater 14 can be controlled to variably alter the energy or heat output thereof as a percentage of the heater's 14 maximum capacity. For example the modulating heater 14 can be controlled to operate at 85% of the heater's 14 maximum capacity, or likewise, to have an equivalent modulation rate of 85%. Conversely, the modulating heater 14 can be modulated by 15% or have a modulation of 15%, which is equivalent to operating at 85% of the heater's 14 maximum capacity. As should be understood by one of ordinary skill in the art, modulation of the heater 14 can be achieved by adjusting a variable gas supply valve or blower speed to control the amount of fuel provided to a burner of the heater. As shown in FIG. 1, the hardware processor 12 could be housed within the modulating heater unit 14 itself, e.g., in a control panel thereof, or another pool or spa device, e.g., a central controller. Additionally, the hardware processor 12 could include, but is not limited to, a centralized or distributed pool or spa control system, a personal computer, a laptop computer, a tablet computer, a smart telephone, a server, and/or a cloud-based computing platform.

The system 10 includes system code 20 (e.g., non-transitory, computer-readable instructions) stored on a computer-readable medium and executable by the hardware processor 12 and/or additional computer systems. The code 20 could include various custom-written software modules that carry out the steps/processes discussed herein, and could include, but is not limited to, a pool occupancy prediction module 22, a capacity optimization module 24, a "silent mode" modulation module 26, a "green mode" modulation module 28, a pump flow matching module 32, and a fuel configuration module 34. The code 20 could be programmed using any suitable programming language including, but not limited to, C, C++, C#, Java, Python, or any other suitable language. Additionally, the code 20 could be distributed across multiple computer systems in communication with each other over a communications network, and/or stored and executed on a cloud computing platform and remotely accessed by a computer system in communication with the cloud platform. The code 20 could communicate with the storage database 16, which could be stored on the same computer system as the code 20, or on one or more other computer systems in communication with the code 20.

Still further, the system 10 could be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 1 is only one potential configuration, and the system 10 of the present disclosure can be implemented using a number of different configurations.

Figure 2:
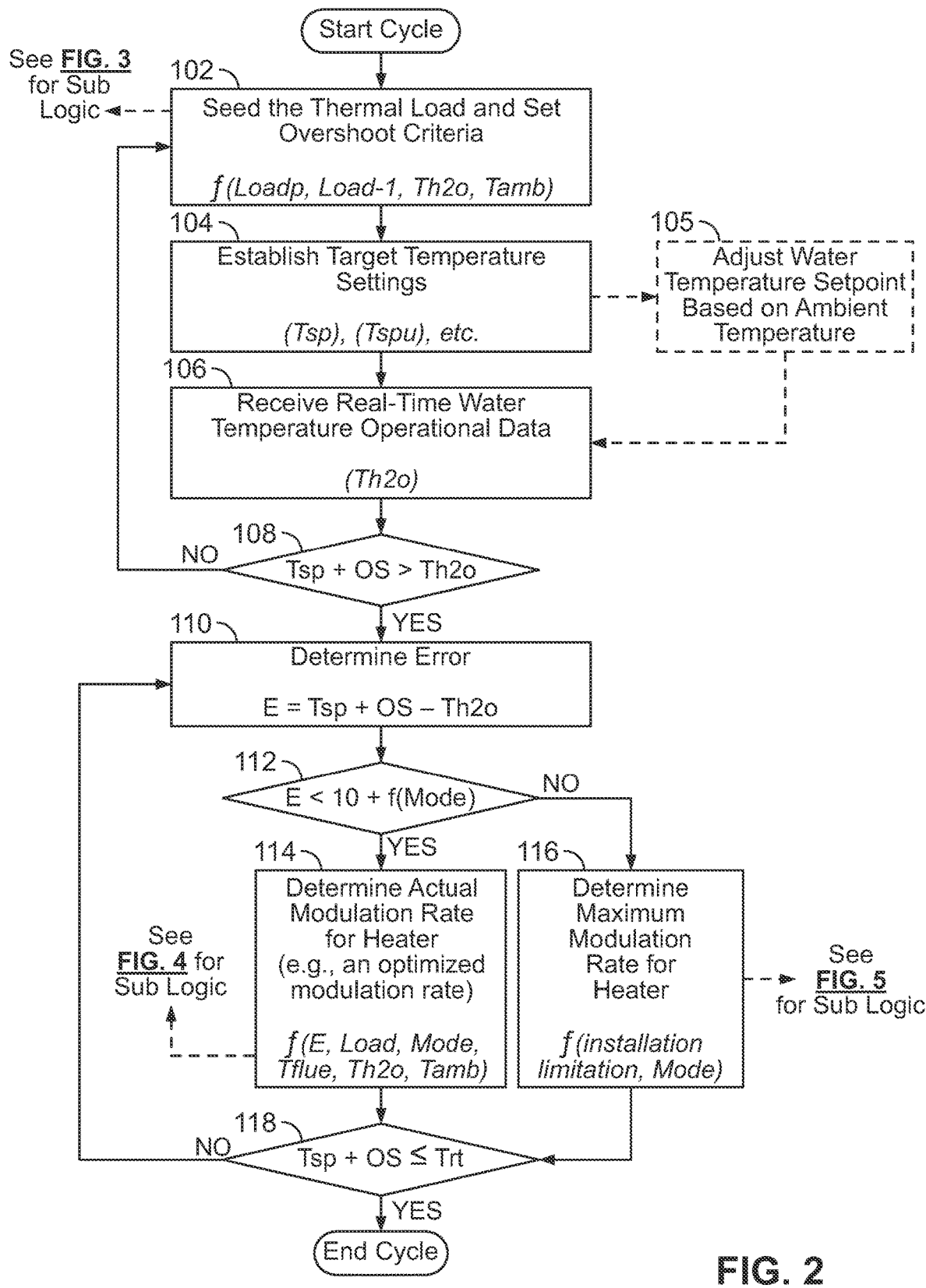
FIG. 2 is a flowchart illustrating overall process steps carried out by the system of the present disclosure.

FIG. 2 is a flowchart illustrating overall process steps carried out by the system 10 of the present disclosure for optimizing the modulation of a pool or spa heater (e.g., modulating heater 14, shown in FIG. 1) for one or more modes of operation (e.g., "silent mode," "green mode," etc.). In step 102, the system 10 seeds the thermal load and sets overshoot criteria for the given mode of operation. Step 102 can be expressed as a function of pertinent variables, such as, Loadp, Load-1, Occ, Th2o, and Tamb−$f$(Loadp, Load-1, Occ, Th2o, Tamb), where Loadp is the predicted load of the pool or spa heater 14 determined by the system 10, Load-1 is the actual load of the pool or spa heater 14 for a previous cycle, Occ is an estimation of pool occupancy, Th2o is the measured real-time temperature of the pool or spa water, and Tamb is the current ambient temperature at the pool or spa installation. Step 102 provides for temperature setpoint and overshoot management for one or more modes of operation for the system including: setpoint overshoot (OS) minimization utilizing a PID control loop algorithm with auto tuning for stable water temperature (Th2o) control; ambient temperature (Tamb) compensation, which can inversely adjust the water temperature setpoint (Tsp) based on the current ambient temperature (Tamb) at the pool or spa installation; set back mode, which can lower the water temperature setpoint (Tsp) when the pool or spa is not in use in order to save energy and reduce heating costs; heater cycle optimization, which can adjust the heater cycle times and overshoot settings (OS) for a given mode of operation to facilitate a minimum amount of mixing of the pool or spa water to ensure equalized temperature distribution and the dispersion of localized hot spots; load prediction, which examines the load for the present heater cycle (Load) and one or more previous heater cycles (Load-1) to predict the next heater cycle load (Loadp); pool occupancy prediction, which can adjust the heater load prediction (Loadp), water temperature setpoints (Tsp), and overshoot (OS) settings based on an estimated pool occupancy determination (Occ); and pool water level or cover alert, which can evaluate whether the water level of the pool or spa is decreasing based on a predicted pool size (PoolSize) from cycle to cycle, the actual load on the heater (Load), and the predicted load (Loadp), with a larger actual heater load (Load) compared to the predicted load (Loadp) indicating that the pool or spa cover may have been removed or dislodged. Step 102 is described in greater detail hereinbelow, in connection with FIG. 3.

In step 104, the system 10 establishes target temperature settings for one or more modes of operation, which can be pre-programmed, or user-defined, setpoints for the pool or spa water. For example, the user can specify an "in-use" target temperature setting for use with heater modes when the pool or spa is in use (Tsp) and a "not in-use" target temperature setting for use with heater modes when the pool or spa is not in use (Tspu). The user could also specify individual target temperature settings for use with each individual mode of operation (e.g., $Tsp_{econ}$, $Tsp_{setback}$, $Tsp_{silent}$, etc.). Optionally, in step 105, the system 10 can adjust the water temperature setpoint (Tsp) for an active mode of operation based on the current ambient temperature (Tamb), or other environmental conditions, at the pool or spa installation. For example, the system 10 can determine an adjusted temperature setpoint (Tsp') for a given mode of operation based on pertinent variables, such as, Tsp, K, and Tamb, given the equation Tsp'=Tsp×K/Tamb, where Tsp is an initial temperature setpoint for the given mode of operation (e.g., specified by the user), K is a constant, and Tamb is the ambient temperature. Accordingly, the adjusted temperature setpoint (Tsp') is inversely proportional to the ambient temperature (Tamb) and, as such, decreases as the ambient temperature increases and increase as ambient temperature decreases, thereby providing a more comfortable user experience.

In step 106, the system 10 receives real-time water temperature operational data (Th2o) from, for example, temperature sensors disposed within the pool or spa or within piping of the heater 14, e.g., the inlet pipe and/or the outlet pip. In step 108, the system 10 determines if the target temperature setting plus allowable overshoot (OS) criteria for the given mode of operation (e.g., maximum allowable deviation from the target temperature setting (Tsp)) is greater than the real-time water temperature operational data (Th2o) received in step 106. As such, step 108 can be expressed as the equation: Tsp+OS>Th2o. If a negative determination is made in step 108, then the process returns to step 102, such that the occupancy ($O_{cc}$) and ambient temperature ($T_{amb}$) inputs continue to affect the target temperature setting (Tsp) and overshoot (OS) criteria. If a positive determination is made in step 108, then the process advances to step 110 where the system 10 determines the error (E) of the heater 14 for the current mode of operation utilizing the following equation: E=Tsp+OS−Th2o.

In step 112, the system 10 determines if the error of the heater 14 is less than ten (10), or some other variable amount, plus a target error for the given mode of operation ƒ(mode), given the equation: E<10+ƒ(mode). If a positive determination is made in step 112, then the process advances to step 114, where the system 10 determines an actual modulation rate for the heater 14, which can be, for example, a minimum modulation rate or an optimized modulation rate, based on a function of pertinent variables, such as, E, Load, Mode, Tflue, Th2o, and Tamb−ƒ(E, Load, Mode, Tflue, Th2o, Tamb), where E is the current error of the heater 14, Load is the current load of the heater 14, Mode refers to one or more (e.g., user defined) parameters related to the current mode of operation (e.g., max modulation rate of 85% in "silent mode"), Tflue is the temperature of the exhaust flue of the heater 14, Th2o is the water temperature, and Tamb is the ambient temperature at the pool or spa installation. Step 114 provides for the actual modulation rate of the heater 14 for one or more modes of operation for the system 10 and can include one or more of: modulation step sizing and ramp up response speed, which provide for adaptive performance modifications and system response linearization; a load dump zone, which is a safety feature to protect the user and the heater 14 from over-temperature conditions if modulation steps or ramp rates become excessive; automatic altitude compensation, which utilizes information related to the altitude of the pool or spa installation to establish the minimum and maximum heater modulation rates; and automatic fuel identification and/or switching, which generates a thermal ignition profile including flue temperature, ambient temperature, and ignition rate(s) to determine if the heater 14 is connected to a natural or propane gas supply. Step 114 is described in greater detail hereinbelow, in connection with FIG. 4.

If a negative determination is made in step 112, then the process advances to step 116, where the system 10 determines the maximum modulation rate for the heater 14, based on a function of pertinent variables, such as, Installation Limitation, and Mode−ƒ(Installation Limitation, Mode), where Installation Limitation refers to one or more of hardware and user-defined limitations related to the modulating heater system 10, such as, but not limited to, maximum output (e.g., BTUs) of a particular modulating heater unit (e.g., heater 14), available fuel supply (e.g., flow rate of natural gas or liquefied petroleum (LP) gas), elevation of the pool or spa installation, etc., and Mode refers to one or more (e.g., user defined) parameters or limitations related to the current mode of operation (e.g., max modulation rate of 85% in "silent mode"). Step 116 provides for the maximum modulation rate of the heater 14 (e.g., maximum capacity) for one or more modes of operation for the system 10 and can include one or more of the following functions: flue temperature scaling, which utilizes information from a flue temperature sensor and a water return (e.g., inlet) temperature sensor for heat exchanger protection; set back recovery, where greater deviations between the setback temperature setpoint (Tspu) and the water temperature setpoint (Tsp) provide for larger allowable overshoot (OS) settings, modulation steps, and modulation ramp rates; a momentary system boost (e.g., "fast" heat mode), which can override of a system setback mode or setpoint temperature while also being integrated into other modes of operation, such as "silent" or "green" modes; heater unit capacity optimization, which utilizes an inlet gas pressure sensor, previous cycle times, and load predictions to determine the maximum capacity of the heater 14 for a given mode of operation; a "silent" mode set back, which includes a dedicated schedule and modulation rate for the silent mode of operation and can further include "soft start" heater operation to reduce noise and instantaneous power requirements; a "green mode" efficiency optimization, including a modulation rate that is a function of both water temperature and heater flue temperature in order to achieve highest possible efficiency over time to heat and cycle optimization; and pump flow matching override, which adjusts the modulation rate and step size such that the heater 14 capacity matches the current pump speed in order to prevent the heat exchanger from overheating, without requiring communication between the heater 14 and a filter pump. Step 116 is described in greater detail hereinbelow, in connection with FIG. 5.

In other words, in step 108, the system makes a determination whether heating is required and in step 110, if a positive determination is made in step 108, the system determines the error of the current heating mode of operation, e.g., how much lower the current water temperature (Th2o) is than the temperature setpoint (Tsp) plus allowable overshoot (OS). Based on the determined error, in step 112, the system determines whether the heater 14 should be operated at a maximum modulation rate for the current mode to provide increased heating, whether the heater 14 should be operated at a minimum modulation rate for the current mode to provide reduced heating, or operated at a modulation rate (e.g., an actual modulation rate or an optimized modulation rate) between these extremes (e.g., where minimum modulation rate<actual or optimized modulation rate<maximum modulation rate). Those of ordinary skill in the art will understand that, as discussed herein, the minimum modulation rate of the pool or spa heater can be determined from a lookup table, based on the particular configuration of the pool or spa heater, listed state variables, and a flame sense threshold, when fired.

The process then advances to step 118, where the system 10 determines if the temperature set point (Tsp) plus the allowable overshoot is less than or equal to the real time temperature operational data received in step 106. As such, step 118 can be expressed as the equation: Tsp+OS≤Th2o. If a positive determination is made in step 118, then the process ends. If a negative determination is made in step 118, then the process returns to step 110.

Figure 3:
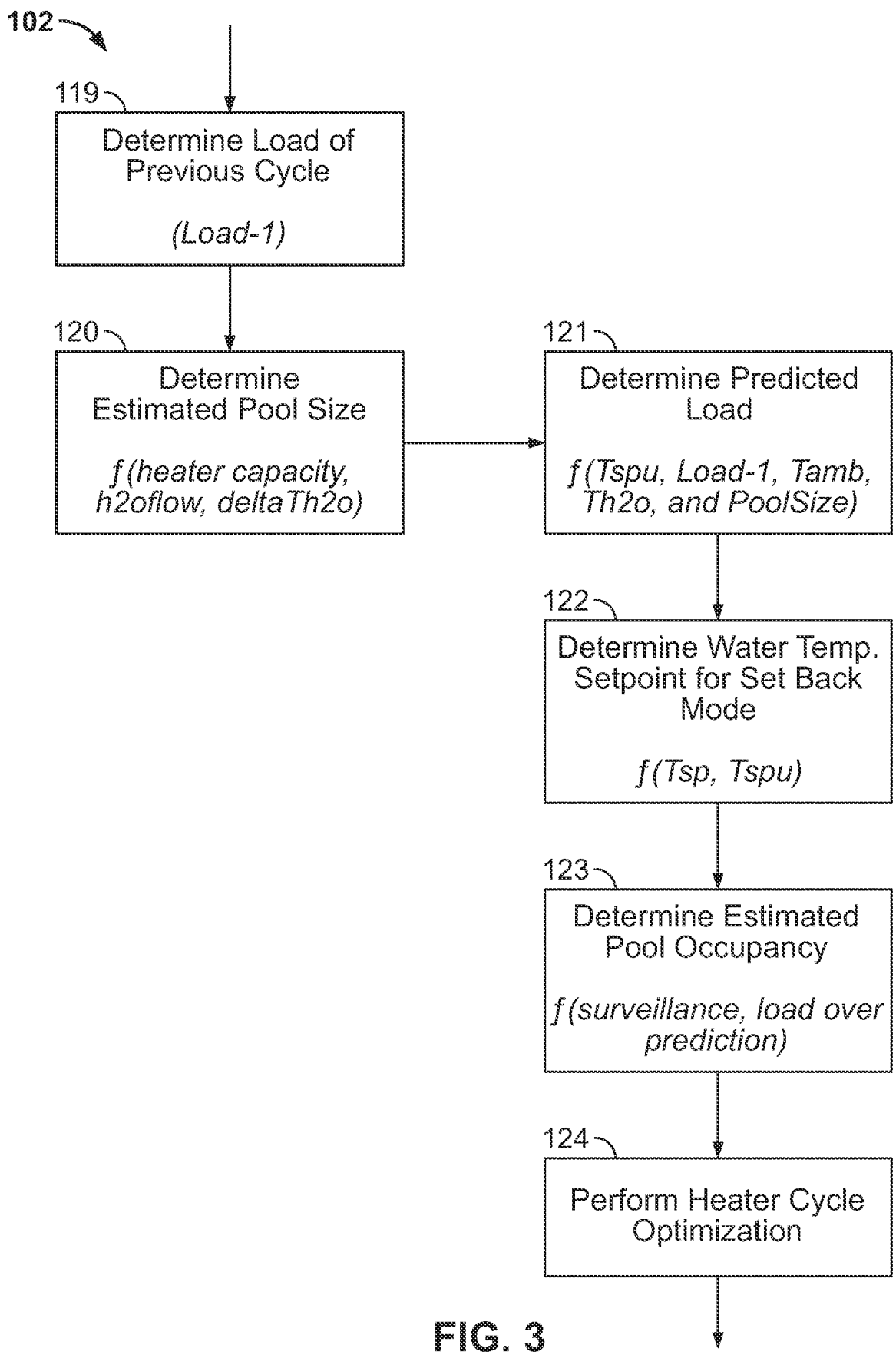
FIG. 3 is a flowchart illustrating processing step 102 of FIG. 2 in greater detail.

FIG. 3 is a flowchart illustrating processing step 102 of FIG. 2 in greater detail. As discussed above in connection with FIG. 2, step 102 can be expressed as a function of pertinent variables, such as, Loadp, Load-1, Occ, Th2o, and Tamb–ƒ(Loadp, Load-1, Occ, Th2o, Tamb), where Loadp is the predicted load of the pool or spa heater 14 determined by the system 10, Load-1 is the actual load of the pool or spa heater 14 for a previous cycle, Occ is an estimation of pool occupancy, Th2o is the measured temperature of the pool or spa water, and Tamb is the current ambient temperature at the pool or spa installation. Processing steps 119-124 of FIG. 3 further illustrate the determination of the previous cycle load (Load-1), estimated pool size (PoolSize), predicted load (Loadp), water temperature setpoints (Tsp, Tspu), pool occupancy (Occ), and heater cycle optimization by the system 10 of the present disclosure.

In step 119, the system 10 determines (e.g., calculates or retrieves from memory) the load of the previous heater cycle (Load-1). According to some aspects of the present disclosure, information related to the previous load can by utilized by the system 10 to provide one or more pool or spa size estimations. For example, the previous load information could include a direct pool size value provided by a user. Additional pool size estimates can be generated with each cycle (e.g., with the longest cycle(s) being weighted the most heavily), calculated based on the water flow rate (e.g., calculated based on input temperature and temperature rise) and the time taken to see an increase in return temperature. According to one example, where the flow rate is 50 gpm and it takes 500 minutes to change the water over, the estimated pool size might be 25000 gallons. If the previous cycle is not one of the top five longest cycles, pool size estimation weighting associated with the previous cycle is ignored, but can still be utilized by the system 10 for water leak detection. It should be understood that the information related to the previous load can be utilized by the system 10 to provide one or more pool or spa size estimations, though, such information in some instances may not provide a comprehensive estimation of pool or spa size. Accordingly, according to some aspects of the present disclosure, process step 119 and process step 120, which also provides an estimated pool or spa size, discussed hereinbelow, can be performed in parallel.

In step 120, the system 10 can determine the estimated pool size (PoolSize), for example, based on a function of pertinent variables, such as heater capacity, h2oflow, and deltaTh2–ƒ(heater capacity, h2oflow, deltaTh2o), where heater capacity is the maximum thermal output (e.g., BTUs) or modulated thermal output of the heater 14 for a given mode of operation or cycle, h2oflow is the volumetric flow rate (e.g., gallons per minute) at which water flows through the heater 14, and deltaTh2o is the change in water temperature (Th2o) over the course of a cycle or given duration of time. That is, the system 10 can estimate the pool size based on how quickly the heater 14 heats the pool/spa water over the course of a cycle or given duration of time. The system 10 can calculate the estimated pool size (PoolSize) every cycle, or continuously, in order to keep track of and/or monitor cycle timing (e.g., the amount of time required to evenly distribute heated water throughout the pool or spa).

In step 121, the system 10 determines the predicted load (Loadp). The system 10 can determine the predicted load (Loadp), for example, based on a function of pertinent variables, such as Tspu, Load-1, Tamb, Th2o, and PoolSize–ƒ(Tspu, Load, Tamb, Th2o, and PoolSize), where Tspu is a water temperature setpoint specified by a user (e.g., when the pool or spa is not being used), Load-1 is the actual load of the pool or spa heater 14 for the previous cycle, Tamb is the ambient temperature at the pool or spa installation (e.g., received via one or more temperature sensors installed at the pool or spa installation, retrieved via the Internet through a network connection, etc.), Th2o is the current water temperature (e.g., received via temperature sensors installed within the heater 14, other pool or spa devices, or the pool or spa itself), and PoolSize is the estimated size of the pool or spa (e.g., as described in connection with step 120 above). The system 10 can also account for other environmental factors in determining the predicted load (Loadp). For example, the system 10 could receive information related to the brightness, sun intensity, or cloud cover at the pool or spa (e.g., from an imaging or security system in communication with the system 10) and could receive additional environmental data (e.g., current temperature, cloud cover, forecasted weather conditions, etc.) from a weather reporting service (e.g., via the Internet), and modify the predicted load (Loadp) based on one or more of these variables, e.g., if there is cloud cover then the predicted load (Loadp) could be increased.

In step 122, the system 10 determines a water temperature setpoint for setback mode (e.g., periods of time when the pool or spa is not being used), which is a function of the water temperature setpoint specified by the user Tspu for when the pool or spa is not being used. The system 10 can also adjust the water temperature overshoot criteria (OS) when setback mode is active, or establish an overshoot setpoint for setback mode ($OS_{setback}$), based on an overshoot setpoint for another (e.g., normal, green, etc.) mode of operation ($OS_{mode}$). For example, the overshoot setpoint for setback mode can be twice that of a normal mode of operation, which can be represented as $OS_{setback}=2*(OS_{mode})$. Accordingly, the temperature of the pool or spa water (Th2o) is allowed a greater deviation from the temperature setpoint (Tspu) when the system 10 is in setback mode. It should be understood that this is but one example and the overshoot setpoint for setback mode ($OS_{setback}$) can be established and/or adjusted based on other criteria discussed herein.

In step 123, the system 10 determines the estimated pool occupancy (Occ). The system 10 can determine the estimated pool occupancy, for example, based on a function of pertinent variables, such as surveillance, and load over prediction–$f$(surveillance, load over prediction), where surveillance represents information received from a surveillance system, vision system, motion detectors, or other pool occupant detection systems in communication with the system 10, and where load over prediction represents the difference between the predicted load (Loadp) on the modulating heater 14 and the actual load on the modulating heater 14. For example, the system 10 can apply machine learning algorithms, or other image processing algorithms, to information received from a surveillance system or other vision system to identify individuals in or around the pool or spa to determine if the pool or spa is occupied and/or determine the number of individuals in or around the pool or spa.

Additionally, if the system 10 determines that the actual load on the heater 14 (Load) is less than the predicted load (Loadp), the system can infer that another heat source (e.g., body heat of occupants) is present, and thereby predict that there are one or more occupants in the pool or spa contributing to the heating of the pool or spa and reducing the actual load (Load) on the heater 14. Similarly, the system 10 can identify load over cycle variation, where the cycle time (e.g., the amount of time required to evenly distribute heated water throughout the pool or spa) is less than a predicted cycle time and thereby predict that there are one or more occupants in the pool or spa contributing to the heating of the pool or spa. The system 10 can also predict the number of occupants in the pool or spa by determining the total thermal output required to achieve the deviation between the actual load (Load) and the predicted load (Loadp), or between the actual cycle time and the predicted cycle time, and by dividing same by a standard thermal output an average adult, child, or the like.

According to some embodiments of the present disclosure, the system 10 can utilize the estimation of pool occupancy (Occ) to adjust (e.g., lower) the predicted load and (e.g., float) the overshoot criteria to optimize the modulation rate of the heater 14. According to one example, the system 10 can determine an adjusted overshoot setting (OS') for a given mode of operation based on pertinent variables, such as, OS, K, and $OCC_n$, given the equation OS'=OS×K/($OCC_n$), where OS is the initial overshoot setting for the given mode of operation (e.g., pre-programmed or specified by a user), K is a constant, and $OCC_n$ is a number (e.g., 1, 2, 3, . . . n) of occupants the system 10 has detected or estimated. That is, the adjusted overshoot setting (OS') can be inversely proportional to the number of occupants. According to another example, the system 10 can also determine an adjusted temperature setpoint (Tsp') for a given mode of operation based on pertinent variables, such as, Tsp, K, and $OCC_n$, given the equation Tsp'=Tsp×K/($OCC_n$), where Tsp is an initial temperature setpoint for the given mode of operation (e.g., specified by the use5), K is a constant, and $OCC_n$ is a number (e.g., 1, 2, 3, . . . n) of occupants the system 10 has detected or estimated. That is, the adjusted temperature setpoint (Tsp') can be inversely proportional to the number of occupants.

In step 124, the system 10 can perform heater cycle optimization (e.g., the amount of time or cycles required to evenly distribute heated water throughout the pool or spa) for a given mode of operation. The system 10 can optimize the cycle, for example, based on a function of the predicted load (Loadp), in order to minimize the amount of mixing (e.g., turnovers) required for the given mode of operation. According to one example, the system 10 can establish a maximum amount of cycles (e.g., per day, hour, etc.) for the heater 14, which can be pre-programmed and/or established by the manufacturer thereof, and can determine a minimum amount of cycles in order to evenly distribute heated water throughout the pool or spa and maintain an even and comfortable temperature for the pool or spa occupants. If the pool or spa is not being used (e.g., operating in setback mode), or occupants are not detected, the system 10 can reduce the amount of heater cycles, while simultaneously increasing the overshoot setting (OS), such that the water temperature (Th2o) can deviate from the water temperature setpoint (Tsp) to a greater extent than would be permitted if the pool or spa was in use. Conversely, if the pool or spa is in use (e.g., operating in green mode), or occupants are detected, the system 10 can increase the amount of heater cycles, while simultaneously decreasing the overshoot setting (OS), such that the water temperature (Th2o) does not deviate from the water temperature setpoint (Tsp) to as large of an extent, thereby providing a more even water temperature and enhancing the user experience. After performing the heater cycle optimization in step 124, the process advances to step 104, as described in connection with FIG. 2.

Figure 4:
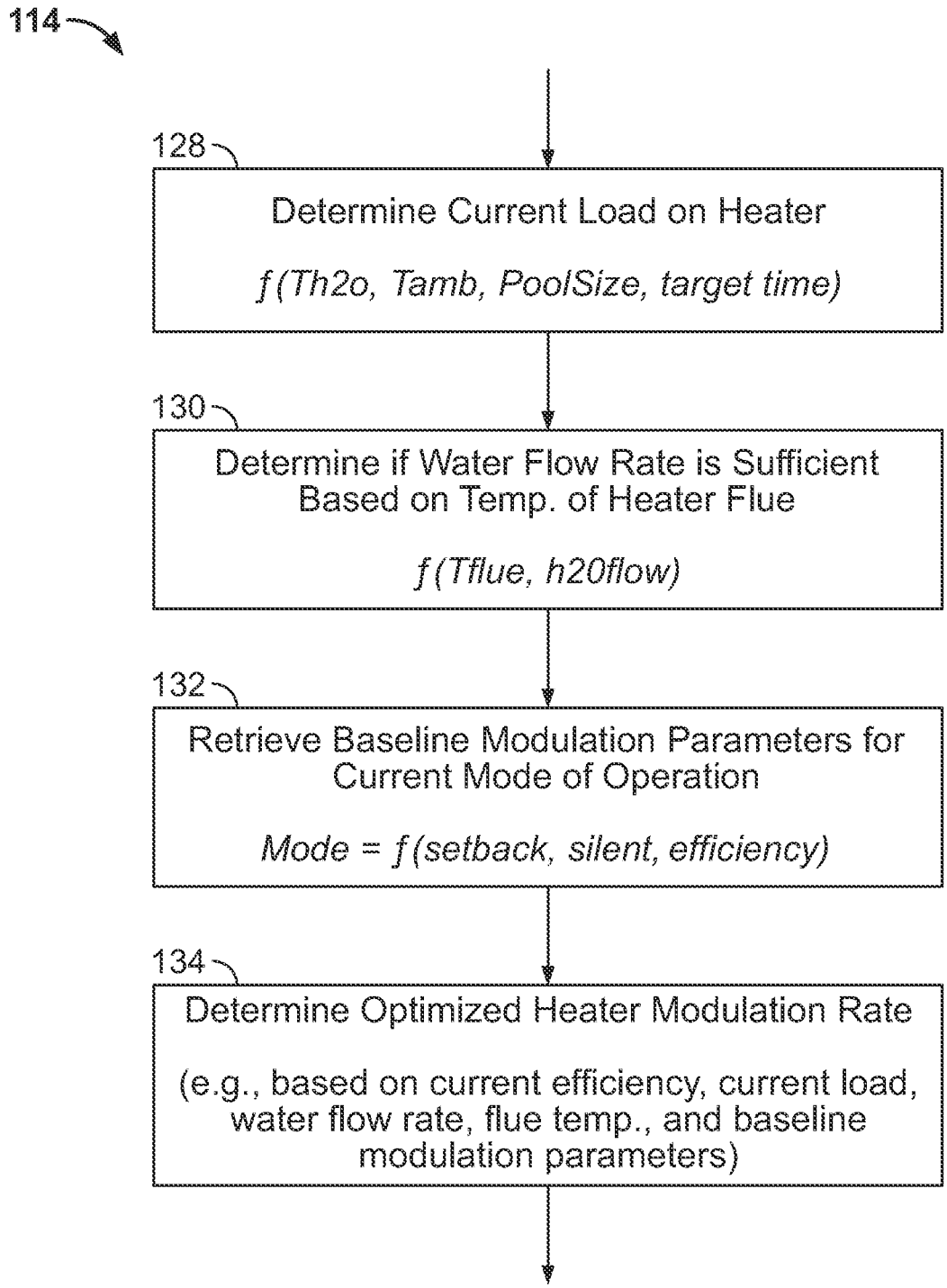
FIG. 4 is a flowchart illustrating processing step 114 of FIG. 2 in greater detail.

FIG. 4 is a flowchart illustrating processing step 114 of FIG. 2 in greater detail. As discussed above in connection with FIG. 2, in step 114 the system 10 determines the actual modulation rate for the heater 14, which can be an optimized modulation rate or a minimum modulation rate, for example, based on the function of pertinent variables, such as, E, Load, Mode, Tflue, Th2o, and Tamb–$f$(E, Load, Mode, Tflue, Th2o, Tamb), where E is the current error of the heater 14, Load is the current load of the heater 14, Mode refers to one or more (e.g., user defined) parameters related to the current mode of operation (e.g., max modulation rate of 85% in "silent mode"), Tflue is the temperature of the exhaust flue of the heater 14, Th2o is the water temperature, and Tamb is the ambient temperature at the pool or spa installation. Processing steps 128-134 of FIG. 4 further illustrate the parameters of this function.

In step 128, the system 10 determines the current load (Load) on the heater 14 based on the equation: Load=$f$(Th2o, Tamb, PoolSize, target time), where Tamb is the temperature of the ambient air at the pool or spa installation, PoolSize represents the volume of the pool or spa (e.g., gallons) and can be calculated from the last 10 cycles, knowing the volumetric flow rate through the heater 14 (h2oflow) and energy balance, and target time is the desired cycle time to heat the pool or spa. For example, in the case of a gas modulating heater, the target time (target time) can be set at 2 hours. In step 130, the system 10 determines if the water flow rate through the heater 14 (h2oflow) is sufficient in order to protect the heat exchanger of the modulating heater 14 from damage due to excessive temperatures, and can be represented by a function of pertinent variables, such as Tflue, and h2oflow–$f$(Tflue, h2oflow), where Tflue is the temperature measured in the flue or stack and h2oflow is the volumetric flow rate of water through the heater 14, which can be measured (e.g., using one or more flow sensors) or calculated based on the measured temperature rise (deltaTh2o) and known input rate of heat generated by the heater 14. In step 132, the system 10 retrieves (e.g., from memory) baseline modulation parameters for the current mode of operation (Mode), which can be represented by the equation, Mode=$f$(setback, silent, green), where setback mode can be represented by the function, $f$(Tsp change 10 deg, target time 4×), silent mode can be represented by the function, ƒ(75% max modulation, target time 3×), and green mode can be represented by the function, ƒ(target time 2×, Tflue 80% max).

According to aspects of the present disclosure, the current mode of operation, which can be represented by the function, Mode=ƒ(setback, recovery, silent, green), can directly impact or control the limits of max modulation, OS, and Target Cycle Time. Furthermore, in setback mode, where Tsp=Tsp-20, target cycle time and OS can be four times the standard values because there are no occupants in the pool or spa and, therefore, having a strict cycle time and OS is not as much of a concern. In recovery mode, the max modulation of the heater can be greater than the max modulation in boost mode, such as, for example, 110% of the max modulation of boost mode, but can also be limited by, for example, a minimum gas pressure and/or a maximum flue temperature. In silent mode, the max modulation can be limited to, for example, 75% max modulation, and the target cycle time can be a multiple of a standard predetermined cycle time (e.g., three times the standard target cycle time), resulting in a longer cycle time. In green mode, the max modulation can be limited as a function of a minimum flue temperature, the current temperature of the pool or spa water, and a target cycle time, which can be, for example, a multiple of a standard predetermined cycle time (e.g., two times the standard target cycle time), resulting in a longer cycle time. Additionally, it is noted that the modulation rate can be adjusted to compensate for fuel supply type, fuel supply pressure, altitude, pool or spa occupancy Occ, stability, etc.

In step 134, the system 10 determines an optimized heater modulation rate based on the current error (E), the current load (Load), the water flow rate (h2oflow), the flue temperature (Tflue), and the baseline modulation parameters discussed in connection with steps 126-132. The process then advances to step 118, as described in connection with FIG. 2.

Figure 5:
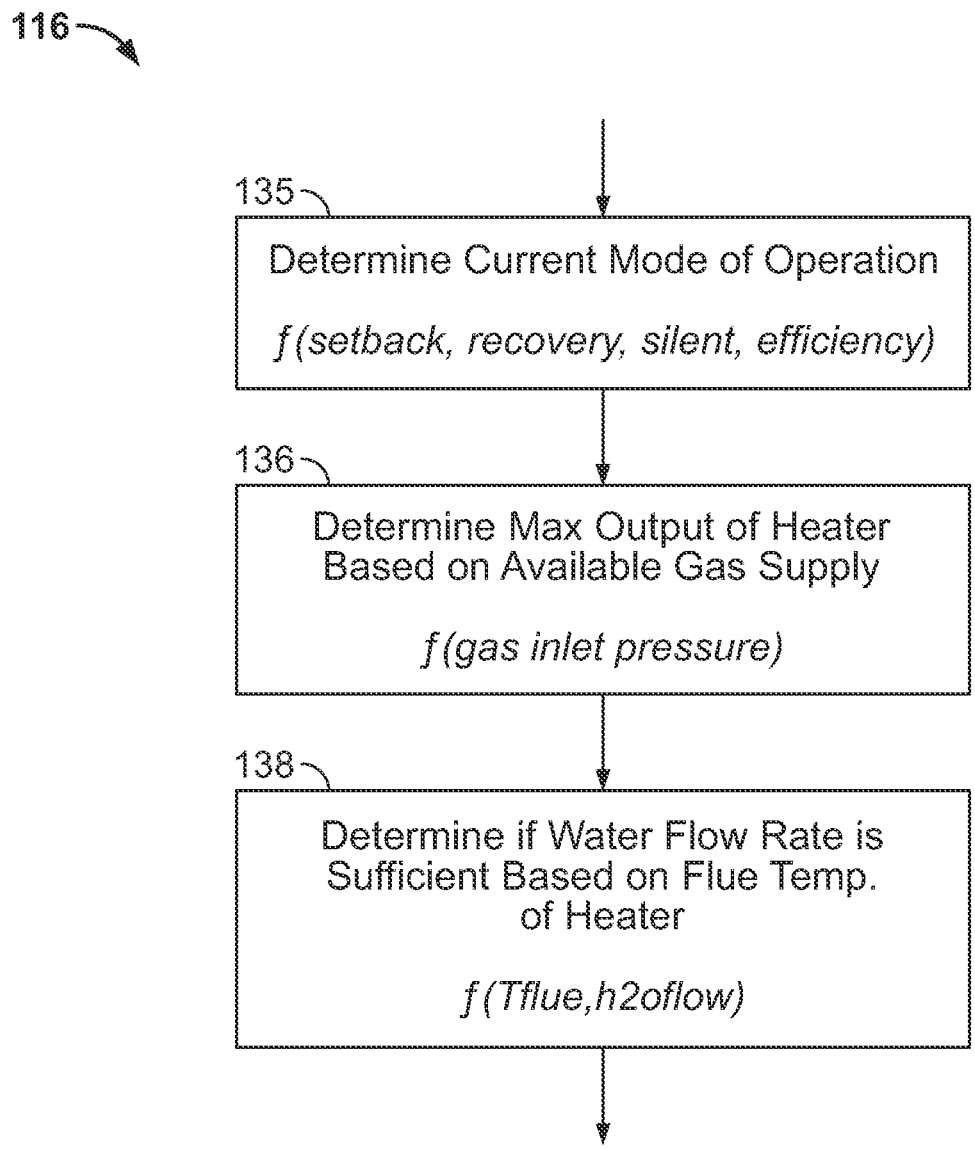
FIG. 5 is a flowchart illustrating processing step 116 of FIG. 2 in greater detail.

FIG. 5 is a flowchart illustrating processing step 116 of FIG. 2 in greater detail. As discussed above in connection with FIG. 2, in step 116 the system 10 determines the maximum modulation rate for the heater 14, e.g., the maximum capacity, based on the function of pertinent variables, such as, Installation Limitation, and Mode-ƒ(Installation Limitation, Mode), where Installation Limitation refers to one or more of hardware and user-defined limitations related to the modulating heater system 10, such as, but not limited to, maximum output (e.g., BTUs) of a particular modulating heater unit (e.g., heater 14), available fuel supply (e.g., flow rate of natural gas or liquefied petroleum (LP) gas), elevation of the pool or spa installation, etc., and Mode refers to one or more (e.g., user defined) parameters or limitations related to the current mode of operation (e.g., max modulation rate of 85% in "silent mode"). Processing steps 135-138 of FIG. 5 further illustrate the parameters of this function. In step 135, the system 10 determines the current mode of operation. As discussed herein, the current mode of operation, which can be represented by the function, Mode=ƒ(setback, recovery, silent, green), can impact or control the limits of max modulation, OS, and Target Cycle Time for each mode of operation. In some aspects, the current mode of operation can be input by a user, e.g., using a pool/spa controller or remote device. In step 136, the system 10 determines the maximum output of the heater 14 based on the available gas supply according to the function ƒ(gas inlet pressure), where gas inlet pressure is the natural or LP supply gas pressure (e.g., PSI) and can be determined by single point or transducer measurement devices. It should be understood that single point measurements can provide a minimum gas pressure reading for satisfactory heater unit operation and transducer measurements can provide additional rate of change information that the system 10 can utilize to predict changes in gas supply conditions. In step 138, similar to step 130 discussed in connection with FIG. 4, the system 10 determines if the water flow rate (h2oflow) through the heater 14 is sufficient in order to protect the heat exchanger of the modulating heater from damage due to excessive temperatures, and can be represented by a function of pertinent variables, such as Tflue and h2oflow-ƒ(Tflue, h2oflow), where Tflue is the temperature measured in the flue or stack and h2oflow is the volumetric flow rate of water through the heater 14, which can measured (e.g., using one or more flow sensors) or calculated based on the measured temperature rise and known input rate of heat generated by the heater 14. For example, Tflue can have a maximum temperature setpoint of 300 degrees Fahrenheit and the system 10 could increase the modulation of the heater 14, thereby decreasing the maximum output of the heater 14, if the Tflue exceeds this setpoint value. The process then advances to step 118, as described in connection with FIG. 2.

It should be understood the system functions to optimize the modulation rate of the heater (e.g., step 114, discussed in connection with FIG. 2, and steps 128-134, discussed in connection with FIG. 4) between a minimum modulation rate and a maximum modulation rate (e.g., step 116, discussed in connection with FIG. 2, and steps 135-138, discussed in connection with FIG. 5), while attempting to reach the target water temperature setpoint, and while targeting a response time setpoint, which is determined by the prior loads and/or cycles.

Figure 6:
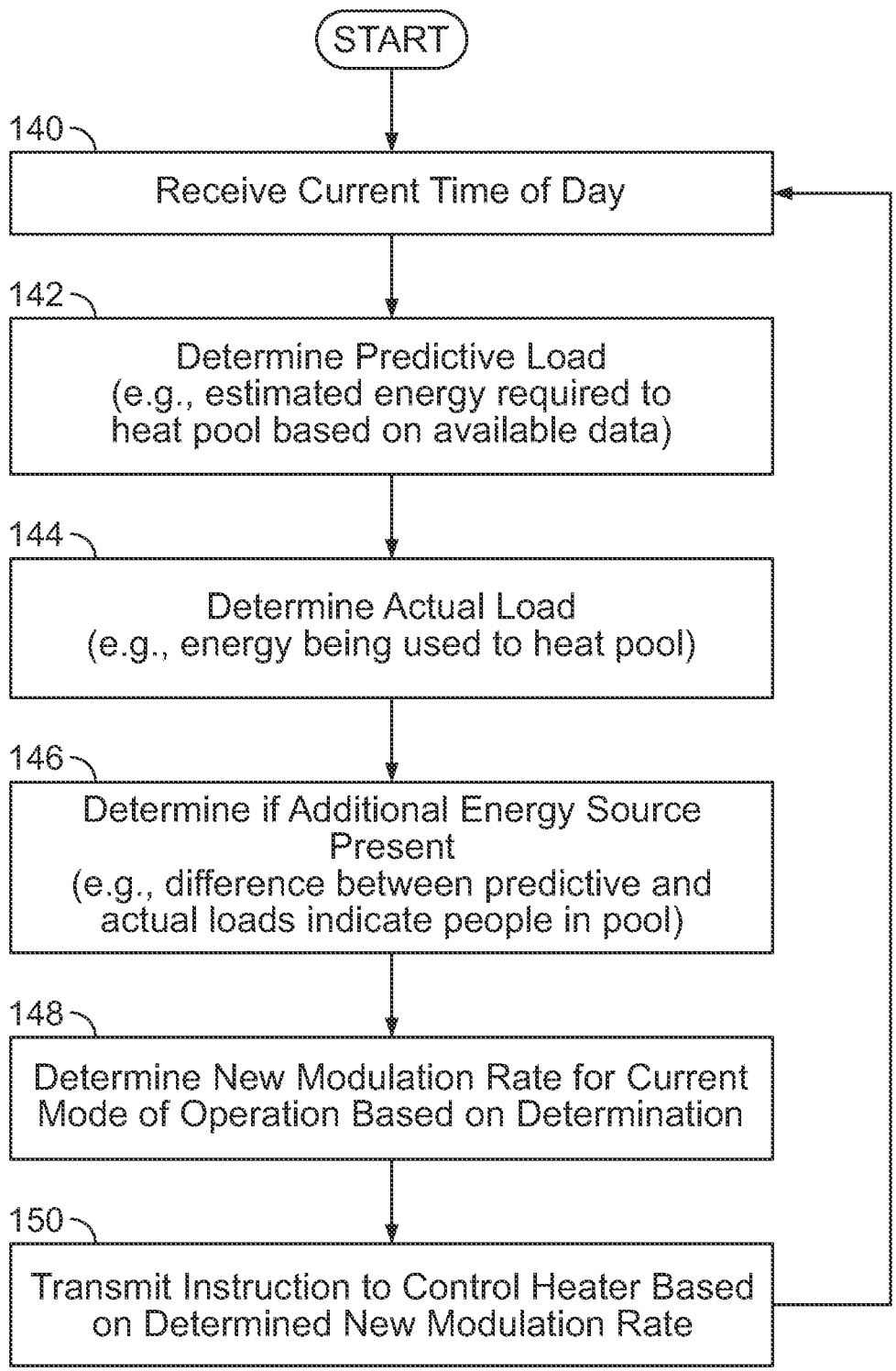
FIG. 6 is another flowchart illustrating process steps carried out according to embodiments of the present disclosure for modulating operation of a pool or spa heater based on a pool occupancy prediction.

FIG. 6 is another flowchart illustrating process steps carried out by the system 10 of the present disclosure in connection with an occupancy mode of operation for optimizing the modulation of the heater 14 based on a pool occupancy prediction. Specifically, the system 10 can utilize the time of day and the predictive load for the heater 14 to determine if there are one or more additional energy sources (e.g., occupants) in the pool or spa. The system 10 can then use this prediction to optimize the modulation rate for silent mode, green mode, etc., or the recovery rate and overshoot calculations described herein.

In step 140, the system 10 receives the current time of day (e.g., via an internal clock or from a remote source, such as the Internet, via a data or network connection). In step 142, the system 10 determines the predictive load (e.g., the estimated energy required to heat the pool or spa based on available data) for the modulating heater. In step 144, the system 10 determines the actual load (e.g., energy currently being used to heat the pool or spa) of the modulating heater by, for example, measuring the volumetric flow rate of the fuel supply and/or measuring the runtime of the heater 14. In step 146, the system 10 determines if one or more additional energy sources (e.g., pool or spa occupants) are present in the pool or spa, for example, by calculating the difference between the predictive and the actual loads, as described in connection with FIG. 3. In step 148, the system 10 determines a new and optimized heater modulation rate for the current mode of operation based on the occupancy determination of step 146. In step 150, the system 10 transmits an instruction to control the heater 14 based on the new modulation rate determined in step 148. The process then returns to step 140.

Figure 7:
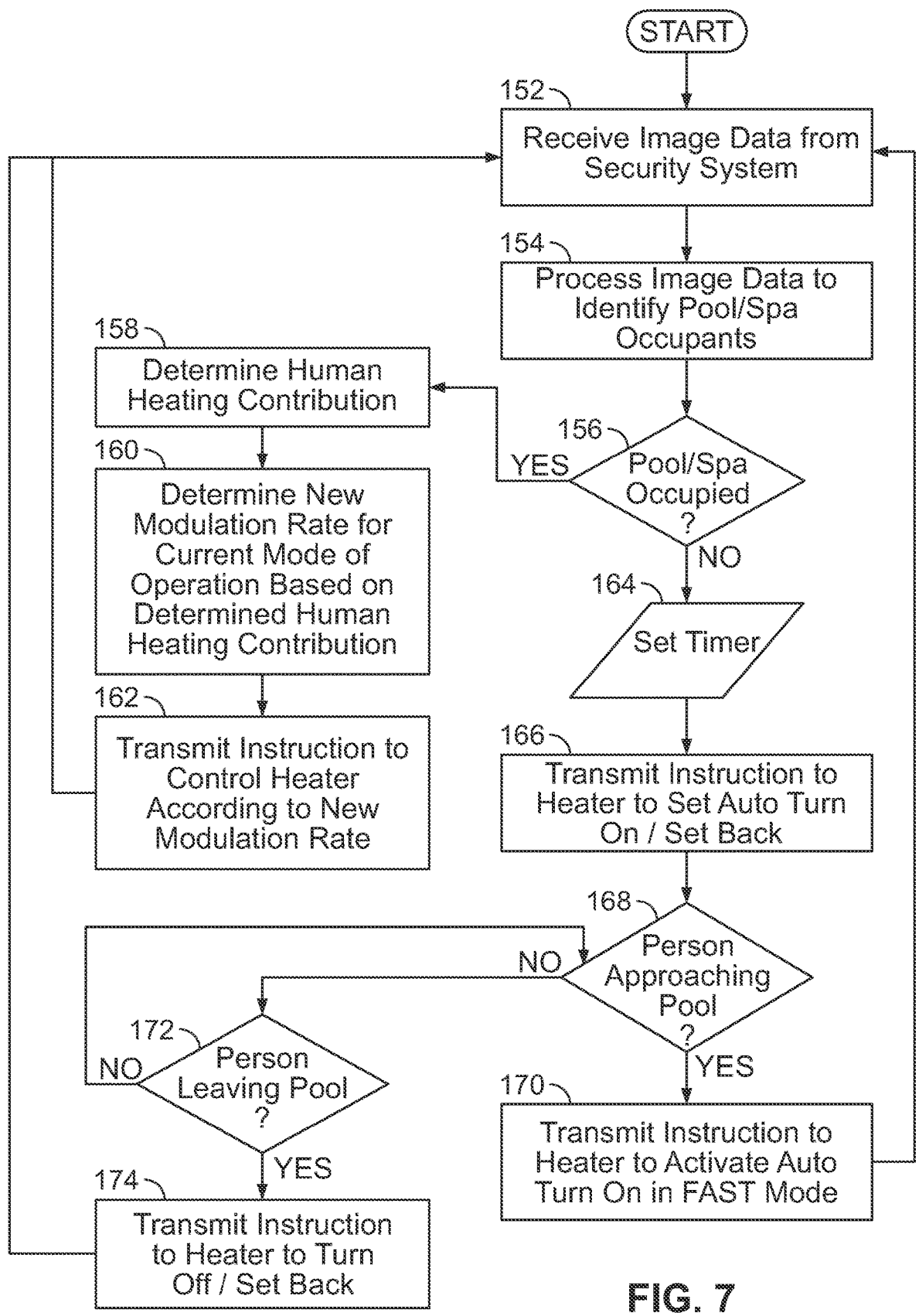
FIG. 7 is another flowchart illustrating process steps carried out according to embodiments of the present disclosure for modulating operation of a pool or spa heater based on a pool occupancy prediction.

FIG. 7 is another flowchart illustrating process steps carried out by the system 10 of the present disclosure in connection with the occupancy mode of operation for optimizing the modulation rate of the heater 14 based on a pool occupancy determination. Specifically, the system 10 can determine the occupancy of a pool or spa based on information received from a security system, or other detection systems, and adjust the modulation rate and/or mode of the heater 14 based on the human heating contribution of the occupants. For example, if no pool or spa occupants are present, the system 10 can initiate an automatic turn on function or temperature set back function after a given period of time has elapsed. Additionally, the system 10 can control the modulating heater to turn on in a "fast" mode when a person enters the pool or spa area and/or control the heater 14 to turn off or initiate the temperature set back function when the person leaves the pool or spa area.

In step 152, the system 10 receives image data from a security, or similar, system associated with the pool or spa installation. In step 154, the system 10 processes the image data from the security system to identify pool or spa occupants (e.g., using machine learning algorithms described herein). In step 156, the system 10 determines if the pool or spa is occupied. If a positive determination is made in step 156, the process advances to step 158, where the system 10 determines the human heating contribution of the pool or spa occupant(s). In step 160, the system 10 determines a new modulation rate for the current mode of operation based on the human heating contribution determined by the system 10 in step 158. In step 162, the system 10 transmits an instruction to control the heater 14 according to the new modulation rate and then the process returns to step 152. If a negative determination is made in step 156, the process advances to step 164, where a timer is set, so that a period of time passes before the process advances to the next step. After the timer has completed, the process advances to step 166, where the system 10 transmits an instruction to the modulating heater to enable the automatic turn on, or temperature set back, function. Accordingly, the system 10 delays enabling the automatic turn on and/or or temperature set back functions until a predetermined period of time has passed (e.g., 2 hours) after the system 10 has determined that the pool or spa is not occupied, thereby preventing the system 10 from prematurely engaging same function while the pool or spa is still in use for the day. In step 168, the system 10 determines if a person is approaching, or has entered, the pool or spa area. If a positive determination is made in step 168, then the process advances to step 170 where the system 10 transmits an instruction to the heater 14 to activate the automatic turn on function in "fast" mode and then the process returns to step 152. If a negative determination is made in step 168, then the process advances to step 172 where the system 10 determines if a person is leaving the pool or spa area. If a positive determination is made in step 172, then the process advances to step 174 where the system 10 transmits an instruction to the heater 14 to turn off or initiates the set back function or mode. The process then returns to step 152. If a negative determination is made in step 172, then the process returns to step 168.

Figure 8A:
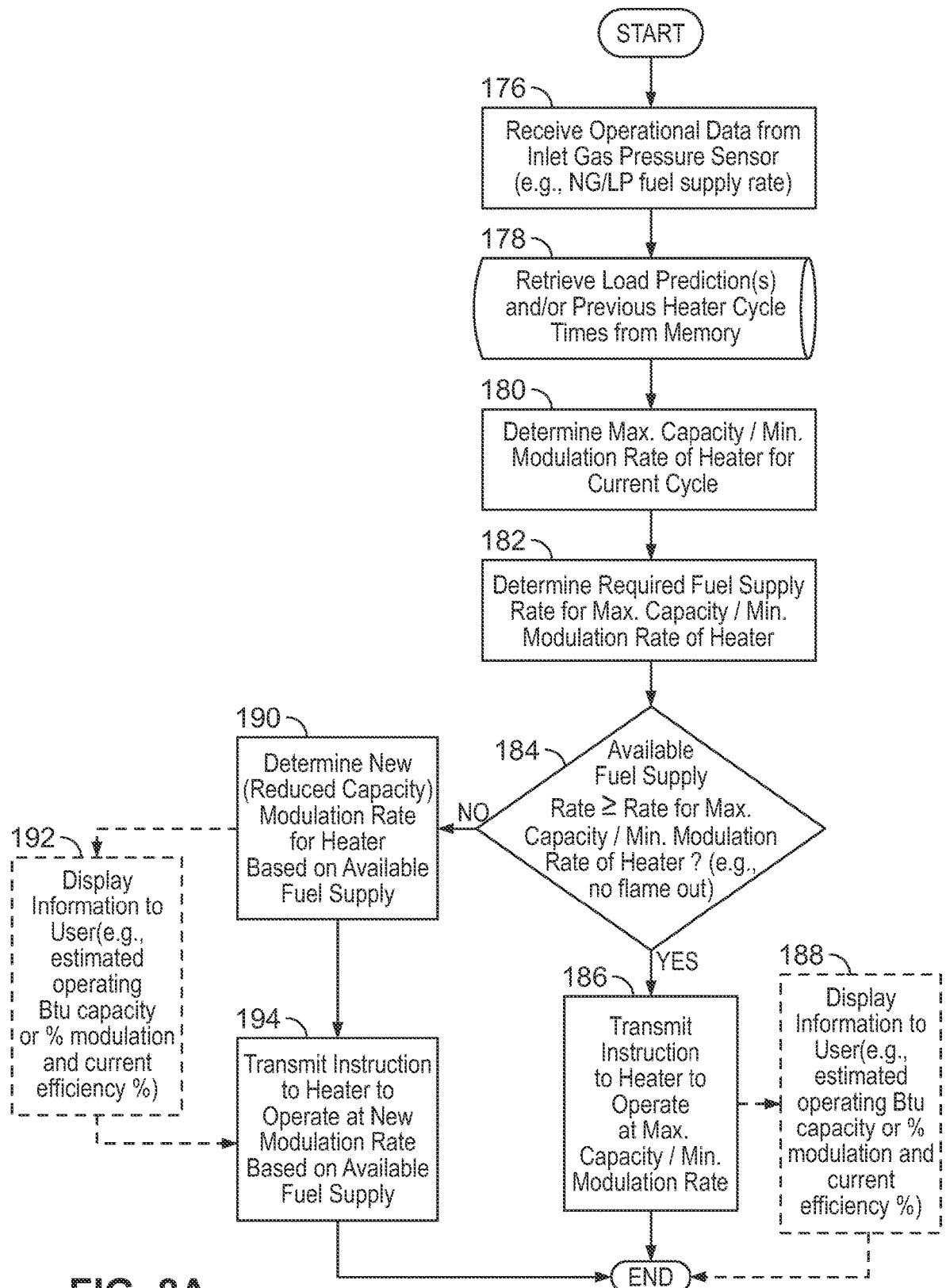
FIG. 8A is another flowchart illustrating process steps carried out according to embodiments of the present disclosure for modulating operation of a pool or spa heater based on availability of a fuel supply.

FIG. 8A is another flowchart illustrating process steps carried out by the system 10 of the present disclosure in connection with an heater unit capacity optimization mode of operation for optimizing the modulation of the heater 14 based on information received from an inlet gas pressure sensor, previous cycle times, and load predictions, which are used to predict a capacity or modulation rate that the heater 14 should be capable of operating at for the present cycle. For example, some gas supplies may not be capable of providing the heater 14 with a sufficient amount of fuel to operate at 100% heater capacity at all operational times, which can cause a flame-out condition (e.g., where the heater 14 attempts to draw fuel faster than it is being supplied, thereby temporarily exhausting its fuel source). A flame out condition can be prevented by modulating the heater 14 to operate at the highest heat capacity output the gas supply will sustain. According to some embodiments, the system 10 can display (e.g., via a smart device, web portal, etc.) an estimated operating Btu capacity, or % modulation, and the current efficiency % of the system.

In step 176, the system 10 receives operational data (e.g., natural gas or LP gas fuel supply rate information) from an inlet gas pressure sensor. In step 178, the system 10 retrieves load prediction(s) and/or previous heater cycle times from the memory. In step 180, the system 10 determines the maximum capacity, or minimum modulation rate, ("desired modulation rate") for the current heating cycle (e.g., 85% output, or 15% modulation in "green" mode) and mode of operation. In step 182, the system 10 determines the required fuel supply rate for the desired modulation rate of the heater 14. In step 184, the system 10 determines if the available fuel supply rate is greater than or equal to the required fuel supply rate for the maximum capacity/minimum modulation of the heater 14, such that a flame out condition is prevented. If a positive determination is made in step 184, then the process advances to step 186, where the system 10 transmits an instruction to the heater 14 to operate at the maximum capacity/minimum modulation for the current cycle and then the process ends. If a negative determination is made in step 184, then the process advances to step 190 where the system 10 determines a new, reduced capacity, modulation rate for the heater 14 based on the available fuel supply. In step 194, the system 10 transmits an instruction to the heater 14 to operate at the new modulation rate based on the available fuel supply and then the process ends. Optionally, in steps 188 and 192, the system 10 can display information to the user (e.g., via smart device, web portal, etc.) related to the current operation of the heater 14 (e.g., estimated operating Btu capacity, modulation rate, and current efficiency) and then the process ends.

Figure 8B:
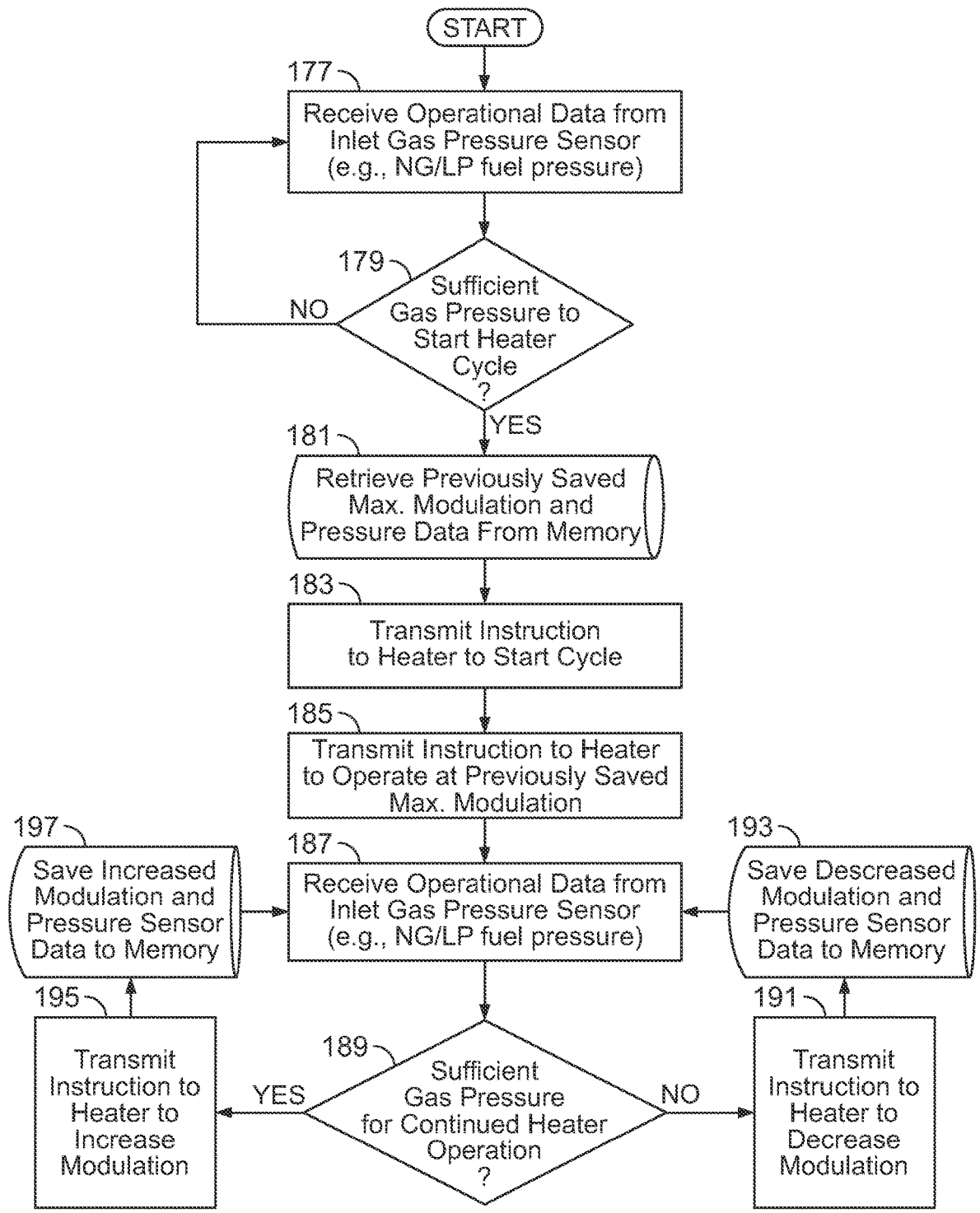
FIG. 8B is another flowchart illustrating process steps carried out according to embodiments of the present disclosure for modulating operation of a pool or spa heater based on availability of a fuel supply.

FIG. 8B is another flowchart illustrating process steps carried out by the system 10 of the present disclosure in connection with an heater unit capacity optimization mode of operation for optimizing the modulation of the heater 14 based on operational data received from an inlet gas pressure sensor (e.g., a binary inlet gas pressure sensor), previous maximum modulations rate for the pool or spa heater, and previous operational data received from the inlet gas pressure sensor, which are used to predict a capacity or modulation rate that the heater 14 should be capable of operating at for the present cycle.

In step 177, the system receives operational data (NG/LP fuel pressure) from an inlet gas pressure sensor. In step 179, the system 10 determines if there is sufficient gas pressure to start the pool or spa heater cycle. If a negative determination is made in step 179, the process returns to step 177. If a positive determination is made in step 179, the process proceeds to step 181 where the system retrieves a previously saved maximum modulation for the pool or spa heater 14 and pressure data from a memory. In step 183, the system 10 transmits an instruction to the heater 14 to start the cycle and in step 185 the system 10 transmits an instruction to the heater 14 to operate at the previously saved maximum modulation. In step 187, the system 10 receives operational data from the inlet gas pressure sensor. Accordingly, the system 10 can monitor the gas pressure from the time of ignition to the current (e.g., previously stored) modulation rate. The process then proceeds to step 189 where the system 10 determines if there is sufficient gas pressure for continued heater operation or a greater heater modulation rate. For example, the system 10 can determine if the operational data from the pressure sensor supports an increase in the maximum modulation rate. If a negative determination is made in step 189, e.g., indicating that the gas pressure cannot support the current heater modulation rate, the process proceeds to step 191 where the system 10 transmits an instruction to the heater 14 to decrease the modulation rate thereof (e.g., by 5%). The process then proceeds to step 193, where the system 10 saves the decreased modulation rate and associated pressure sensor operational data to the memory before returning to step 187. If a positive determination is made in step 189, e.g., indicating that the gas pressure can support the current heater modulation rate and/or possibly a greater modulation rate, the process proceeds to step 195 where the system 10 transmits an instruction to the heater 14 to increase the modulation rate (e.g., by 2%) thereof. The process then proceeds to step 197 where the system 10 saves the increased modulation rate and associated pressure sensor operational data to the memory before returning to step 187. Accordingly, the system 10 can continuously modulate the pool or spa heater 14 to achieve a stable and optimized operation.

Figure 9:
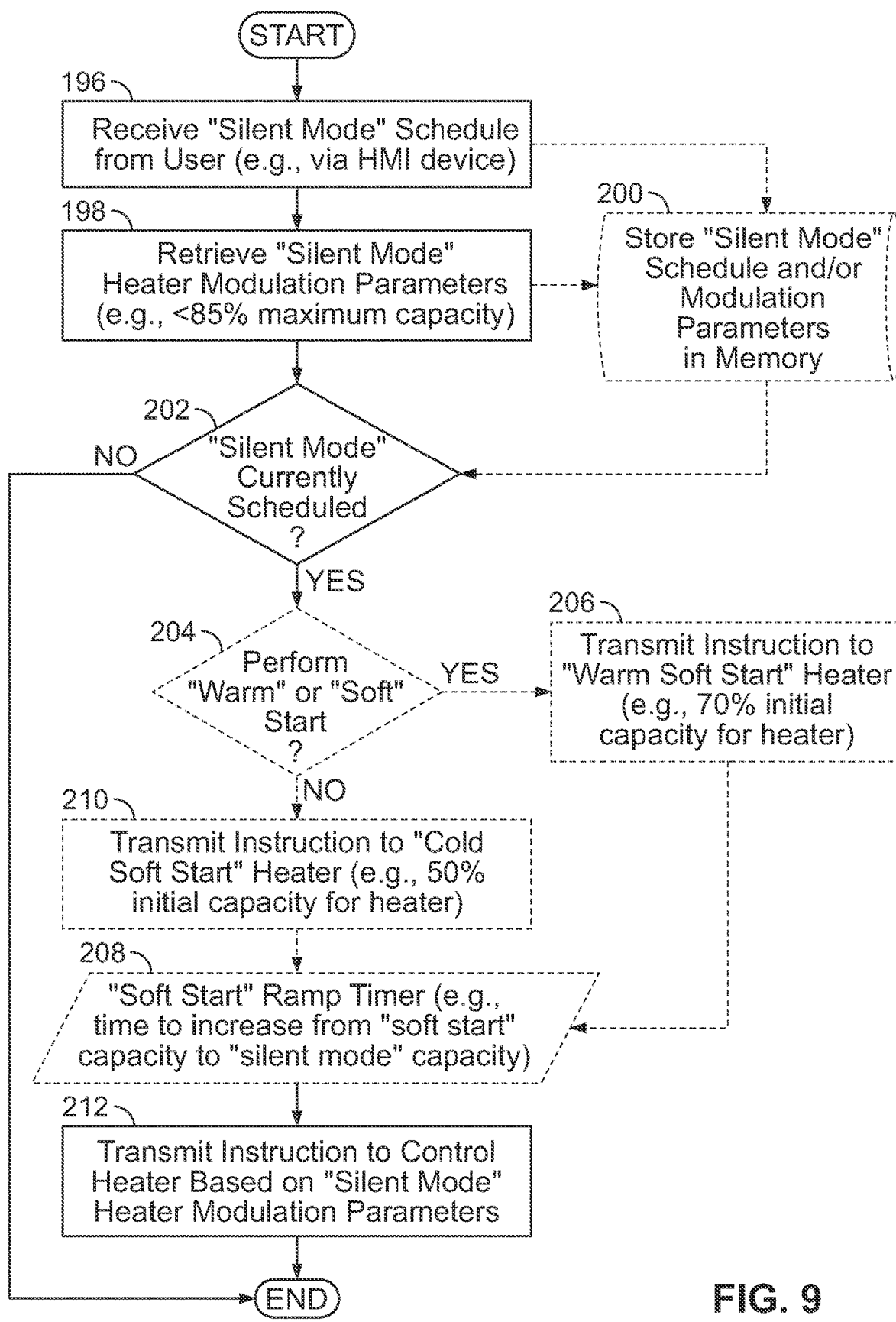
FIG. 9 is another flowchart illustrating process steps carried out according to embodiments of the present disclosure for modulating operation of a pool or spa heater based on parameters associated with a silent mode of operation.

FIG. 9 is another flowchart illustrating process steps carried out by the system 10 of the present disclosure for optimizing the modulation of the heater 14 based on user defined parameters for a "silent" mode. For example, the process allows the user to specify both a schedule and a modulation rate for silent mode (e.g., on weeknights after 7:00 pm operate at <85% max modulation rate). According to some embodiments of the present disclosure, a "soft start" feature can be also be included in silent mode where the default heater starting capacity can be lower than the maximum modulation rate, thereby enabling a slower heater blower speed that is quieter. The soft start function could also be provided with both "cold start" and "warm start" conditions with the modulation rate for the warm start being lower than the modulation rate for the cold start condition.

In step 196, the system 10 receives a silent mode schedule from a user (e.g., via an HMI device provided on the heater 14, a smart device, web interface, etc.). In step 198, the system 10 retrieves silent mode modulation parameters (e.g., <85% maximum capacity or >15% modulation). The silent mode modulation parameters can be design limits that are pre-programmed into the memory of the heater 14 by a manufacturer of the heater 14, or can be specified, or altered, by a technician or the user. Optionally, in step 200, the system 10 can store the silent mode schedule and/or modulation parameters in the memory (e.g., storage database 14). In step 202, the system 10 determines if silent mode is currently scheduled. If a positive determination is made in step 202, then the process advances to step 212 where the system 10 transmits an instruction to control the heater 14 based on the silent mode heater modulation parameters. If a negative determination is made in step 202 then the process ends. Optionally, if a positive determination is made in step 202, then the process can advance to step 204 where the system 10 determines if a "warm soft start" or a "cold soft start" should be performed by the heater 14 based on one or more variables, such as, the current water temperature (Th2o), the target water temperature setting (Tsp), the ambient air temperature (Tamb) at the pool or spa installation, and/or the current mode of operation. According to one example, if the system 10 determines that the deviation between the current water temperature (Th2o) and the target water temperature setting (Tsp) is greater than a predetermined threshold (e.g., while the system is in recovery mode), then the system 10 can perform a "warm soft start" on the heater 14 to increase the water temperature rapidly, whereas if the system 10 determines that the deviation between the current water temperature (Th2o) and the target water temperature setting (Tsp) is less than a predetermined threshold, then the system 10 can perform a "cold soft start" on the heater 14 to increase the temperature of the water at a slower pace. Similarly, if the system 10 determines that that the deviation between the current water temperature (Th2o) and the water temperature of the previous heater cycle (e.g., retrieved from memory) is greater than a predetermined threshold (e.g., the pool or spa is rapidly losing heat due to low ambient air temperatures), then the system 10 can perform a "warm soft start" on the heater 14, whereas if the system 10 determines that that the deviation between the current water temperature (Th2o) and the water temperature of the previous heater cycle is less than a predetermined threshold (e.g., the pool or spa is retaining heat due to high ambient air temperatures) then the system 10 can perform a "cold soft start" on the heater 14. If a positive determination is made in step 204, then the process advances to step 206 where the system 10 transmits an instruction to "warm soft start" the heater 14. If a negative determination is made in step 204, then the process advances to step 210 where the system 10 transmits an instruction to "cold soft start" the heater 14. In step 208, a soft start ramp timer is initiated. Accordingly, the warm soft start and cold soft start functions can specify that the heater 14 initially operates at a reduced capacity (e.g., 70% capacity for a warm soft start and 50% capacity for a cold soft start) and then the soft start ramp timer discussed in connection with step 208 gradually increases the capacity of the heater 14 until it reaches the maximum capacity specified for silent mode (e.g., 85%).

Figure 10:
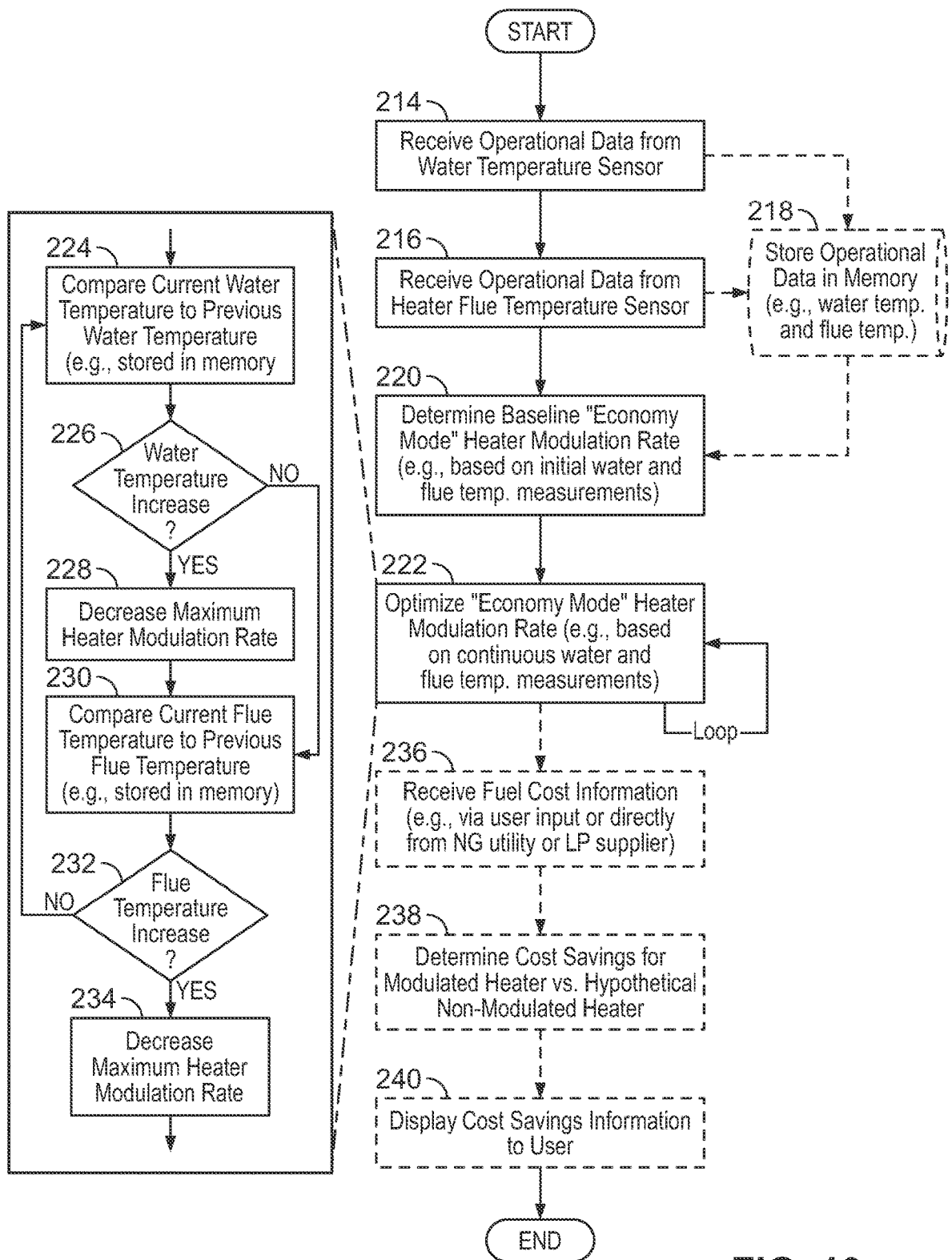
FIG. 10 is another flowchart illustrating process steps carried out according to embodiments of the present disclosure for optimizing modulation of a pool or spa heater based on parameters associated with a green mode of operation.

FIG. 10 is another flowchart illustrating process steps carried out by the system 10 of the present disclosure in connection with a "green" mode of operation, which is also referred to herein as an "economy" or "efficiency" mode, for optimizing the modulation of the heater 14 as a function of both water temperature and heater flue or stack temperature. For example, as water temperature rises, the heater 14 modulation can be increased and as the heater 14 flue temperature rises, heater modulation can also be increased. Accordingly, the system 10 can continuously optimize the modulation rate of the heater 14 based on the water and flue temperature changes, thereby achieving the highest possible efficiency over time for heating and cycle optimization. According to some embodiments of the present disclosure, the user can enter the cost of the heater fuel (e.g., $/therm rate), or the system can use default rate received from a NG utility or LP supply source. The system 10 can then determine the amount of energy savings achieved by the present modulating heater system vs. a non-modulating heater system.

In step 214, the system 10 receives operational data from one or more temperature sensors in fluidic communication with the pool or spa water. In step 216, the system 10 receives operational data from one or more temperature sensors in communication with the heater flue. Optionally, in step 218, the system 10 stores the operational data from the one or more temperature sensors (e.g., water temperature and flue temperature) in a memory. In step 220, the system 10 determines a baseline "economy mode" or "green mode" heater modulation rate (e.g., based on initial water and flue temperature measurements). In step 222, the system 10 continuously optimizes the "economy" or "green" mode heater modulation (e.g., based on continuous water and flue temperature measurements), thereby providing for the most efficient operation possible. As shown, step 222 can further include steps 224-234 for optimizing the green mode heater modulation rate.

In step 224, the system 10 compares the current water temperature to a previous water temperature reading (e.g., stored in memory or database 14). In step 226, the system 10 determines if the current water temperature has increased from the previous water temperature reading. If a positive determination is made, then the process advances to step 228 where the system 10 decreases the maximum heater modulation rate. In step 230, the system 10 compares the current flue temperature to a previous flue temperature reading. If a negative determination is made in step 226, then the process skips step 228 and advances to step 230. In step 232, the system 10 determines if the current flue temperature has increased from the previous flue temperature reading. If a positive determination is made in step 232, then the process advances to step 234 where the system 10 decreased the maximum heater modulation rate. If a negative determination is made in step 232, then the process returns to step 224 and the optimization process continues. It should be understood that the foregoing process steps 224-234 can together function to provide for operation of the pool or spa heater 14 at a minimum allowable design flue temperature for the given water temperature. Thus, according to some aspects of the present disclosure, the system 10 does not compare the current water temperature to a previous water temperature. According to such aspects, the system 10 targets a max modulation rate (e.g., minimum output) that is sufficient to provide a flue temperature that keeps critical components above their respective dew points, said dew points being governed by the return water temperatures of the pool or spa heater (e.g., typically, within 35° F.-104° F.).

Optionally, in step 236, the system 10 can receive fuel cost information (e.g., via user input or directly from an NG utility or LP gas supplier via a data or network connection). In step 238, the system 10 can optionally determine the cost savings provided by the modulated heater (e.g., running at the current modulation rate optimized in step 222) versus a hypothetical model of a non-modulated, but otherwise similar, pool or spa heater system. In step 240, the system 10 can optionally display the cost savings information to a user.

Figure 11:
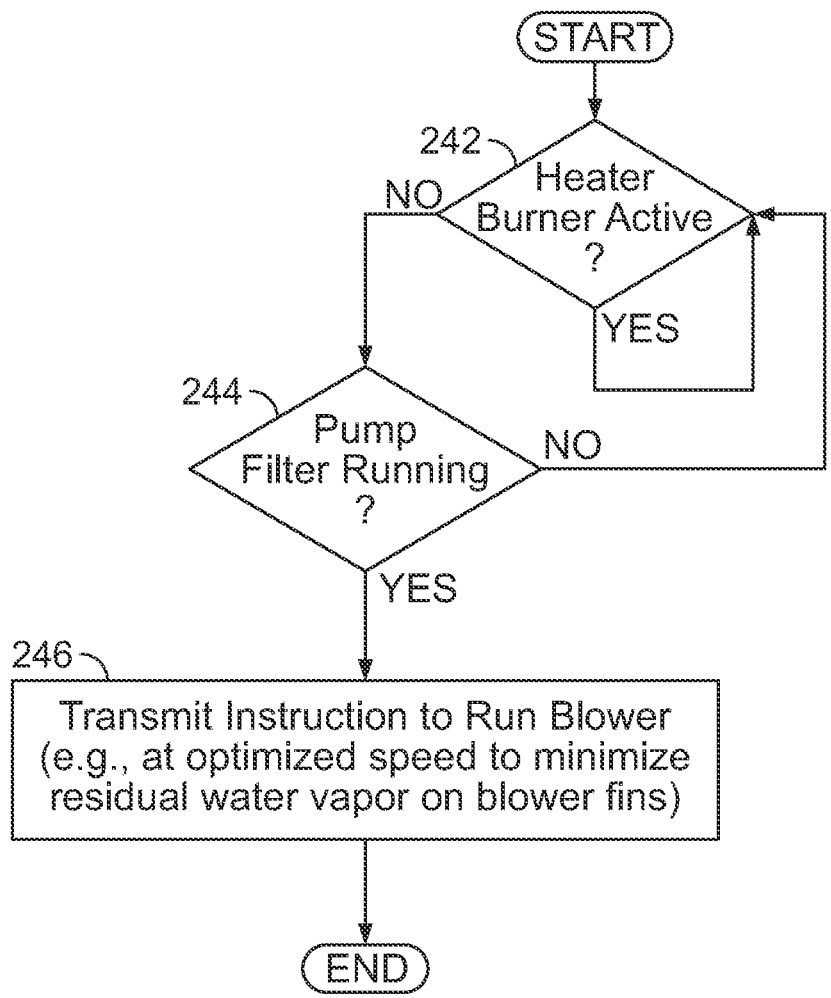
FIG. 11 is another flowchart illustrating process steps carried out according to embodiments of the present disclosure for operation of a pool or spa heater according to a cool down mode of operation.

FIG. 11 is another flowchart illustrating process steps carried out by the system 10 of the present disclosure including a "cool down" optimization function. For example, when the burner of the modulating heater is not running and the gas is off, but the pump filter remains active, the system 10 can continue to run the blower of the modulating heater at an optimized speed to minimize residual water vapor on the fins thereof. According to another example, while the heater 14 is cooling down (e.g., when the heater has recently been deactivated), the blower can remain on for a duration to minimize the residual water vapor on the fins thereof, but with the blower speed being gradually reduced as the heater 14 cools down until the heater 14 is substantially cool and the blower is deactivated. As such, it should be understood that the system 10 does not execute the "cool down" optimization function when the heater 14 has been inactive for a given duration, or when the temperature of the heater 14 is below a given threshold.

The cool down optimization function, described in greater detail below, can be embodied as a set of fixed heater ignition control parameters that are pre-programmed into the memory of the heater 14 by a manufacturer thereof, or alternatively, can be altered by a technician or by the user.

In step 242, the system 10 determines if the heater 14 burner is currently active. If a negative determination is made in step 242, then the process advances to step 244 where the system 10 determines if the pump is currently running. If a positive determination is made in step 242, then the step repeats and system 10 determines if the heater 14 burner is active. If a positive determination is made in step 244, then the process advances to step 246 where the system 10 transmits an instruction to run the blower of the modulating heater (e.g., at an optimized speed that minimizes residual water vapor on the fins of the heater 14 blower, while also reducing the energy required by the blower at full-speed operation). If a negative determination is made in step 244, then the process returns to step 242.

Figure 12:
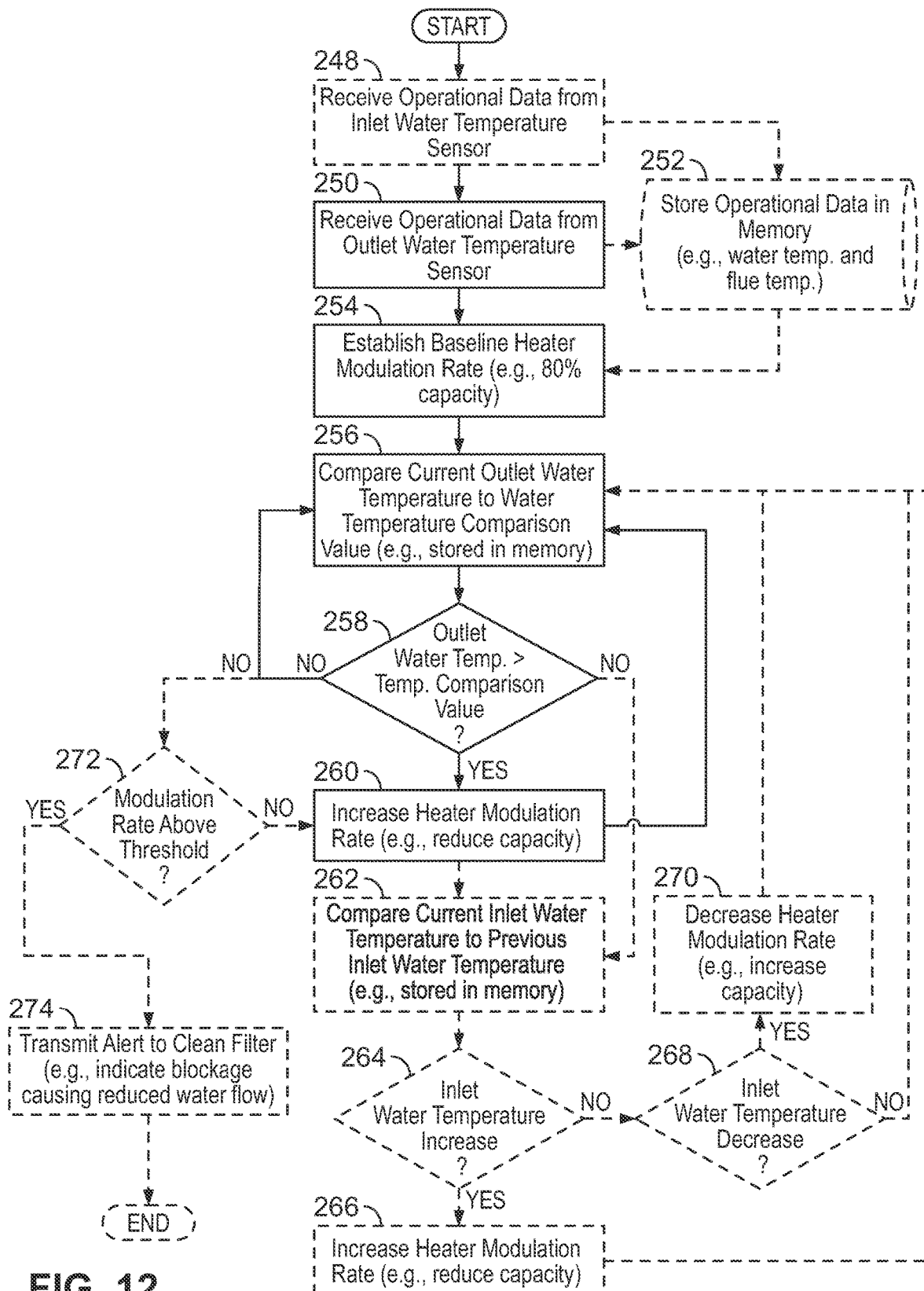
FIG. 12 is another flowchart illustrating process steps carried out according to embodiments of the present disclosure for modulating operation of a pool or spa heater based on heater inlet and heater outlet temperature measurements.

FIG. 12 is another flowchart illustrating process steps carried out by the system 10 of the present disclosure including a heater protection function whereby the system 10 limits the maximum capacity of the heater 14 based on a function of pool or spa water temperature increase and the water temperature as it exits the modulating heater, thus preventing overheating of the heat exchanger. Furthermore, the process described in connection with FIG. 12 does not require communication between the heater 14 and the filter pump, or knowledge of the current flow rate through the modulating heater.

Optionally, in step 248, the system 10 receives operational data from an inlet water temperature sensor. In step 250, the system 10 receives operational data from an outlet water temperature sensor. Optionally, in step 252, the system 10 stores the operational data in a memory (e.g. water temperature and flue temperature). In step 254, the system 10 establishes a baseline heater modulation rate (e.g., 80% capacity). In step 256, the system 10 compares the current outlet water temperature to a water temperature comparison value (e.g., stored in memory). According to aspects of the present disclosure, the water temperature comparison value can be a threshold value or a previous outlet water temperature reading. In step 258, the system 10 determines if the outlet water temperature has increased. If a positive determination is made, then the process proceeds to step 260 where the system 10 increases the heater 14 modulation rate (e.g., reduces capacity) and returns to step 256 for continued outlet water temperature analysis, but if a negative determination is made then the process returns to step 256 for continued outlet water temperature analysis. Optionally, in step 272, the system 10 can determine if the heater 14 modulation rate (e.g., capacity) is above a given threshold. If a positive determination is made, then the process can advance to optional step 274, where the system 10 transmits an alert to clean the pool or spa filter (e.g., indicating a blockage that is causing reduced water flow), and if a negative determination is made in step 272, then the process can advance to previously described step 260. Optionally, in step 262, the system 10 compares the current inlet water temperature to a previous inlet water temperature reading (e.g., stored in memory). In optional step 264, the system 10 determines if the current inlet water temperature has increased. If a negative determination is made, then the process returns to step 256, but if a positive determination is made, then the process advances to optional step 266 where the system 10 increases the heater 14 modulation rate and then the process returns to step 256. Optionally, if a negative determination is made in step 264, the process can proceed to step 268 where the system 10 determines if the inlet water temperature has decreased. If a negative determination is made in step 268, then the process returns to step 256, but if a positive determination is made in step 268, then the process can advance to optional step 270 where the system 10 can decrease the heater 14 modulation rate (e.g., increasing capacity) before returning to step 256.

Figure 13:
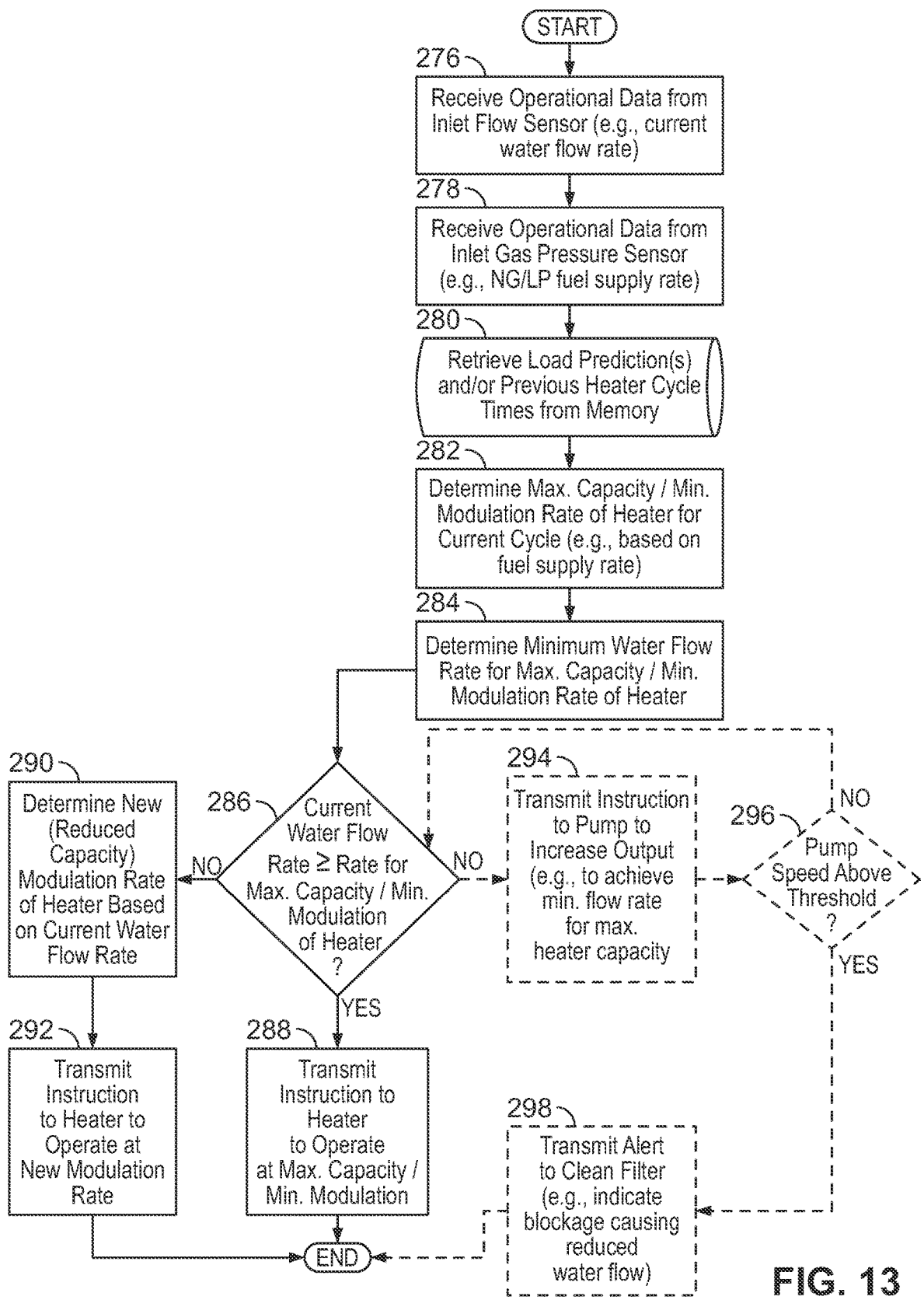
FIG. 13 is another flowchart illustrating process steps carried out according to embodiments of the present disclosure for modulating operation of a pool or spa heater based on a water flow rate passing through the heater.

FIG. 13 is another flowchart illustrating process steps carried out by the system 10 of the present disclosure for optimizing the modulation rate of the heater 14 and including a heater protection function where the filter pump flow rate is the limiting condition to operating the modulating heater at a higher capacity. For example, the system 10 can control the filter pump to increase the flow rate to as high as the gas supply will allow. According to another example, if the pump needs to bypass, or the system reduces flow to (e.g., via a controllable valve), the heater in order to operate a water feature, or the like, the system 10 can increase the modulation rate (e.g., reduce the maximum capacity) of the heater 14 to protect the heater 14 from damage.

In step 276, the system 10 receives operational data from an inlet flow sensor (e.g., current water flow rate through the heater 14). In step 278, the system 10 receives operational data from an inlet gas pressure sensor (e.g., NG or Lpgas supply rate). In step 280, the system 10 retrieves load predictions(s) and/or previous heater times from the memory. In step 282, the system 10 determines the maximum capacity/minimum modulation rate for the heater 14 for the current cycle (e.g., based on fuel supply rate as described herein). In step 284, the system 10 determines the minimum water flow rate required for the maximum heater capacity and minimum modulation rate determined in step 282. In step 286, the system 10 determines if the current water flow rate through the heater 14 is greater than or equal to the water flow rate required for maximum capacity and minimum modulation rate of the heater 14. If a positive determination is made, then the process advances to step 288 where the system 10 transmits an instruction to operate the heater 14 at the maximum capacity and minimum modulation rate determined in step 282 and then the process ends. If a negative determination is made in step 286, then the process advances to step 290 where the system 10 determines a new reduced capacity modulation rate for the heater 14 based on the current water flow rate. In step 292, the system 10 transmits an instruction to operate the heater 14 at the new modulation determined by the system in step 290 and then the process ends.

Optionally, if a negative determination is made in step 286, then the process can proceed to step 294 where the system 10 transmits an instruction to increase the output of the pump. In step 296, the system 10 determines if the current pump speed is above a predetermined threshold. If a negative determination is made in step 296, then the process returns to step 286. If a positive determination is made in step 296, then the process can advance to optional step 298 where the system 10 transmits an alert to clean the filter (e.g., indicating a blockage causing reduced water flow) and then the process ends. While the foregoing process of FIG. 13 can be utilized to identify a dirty filter and predict filter cleaning, it can also be reactive to the switching of a pump from usage with a spa to a pool, and back, which can result in large head differences.

Figure 14:
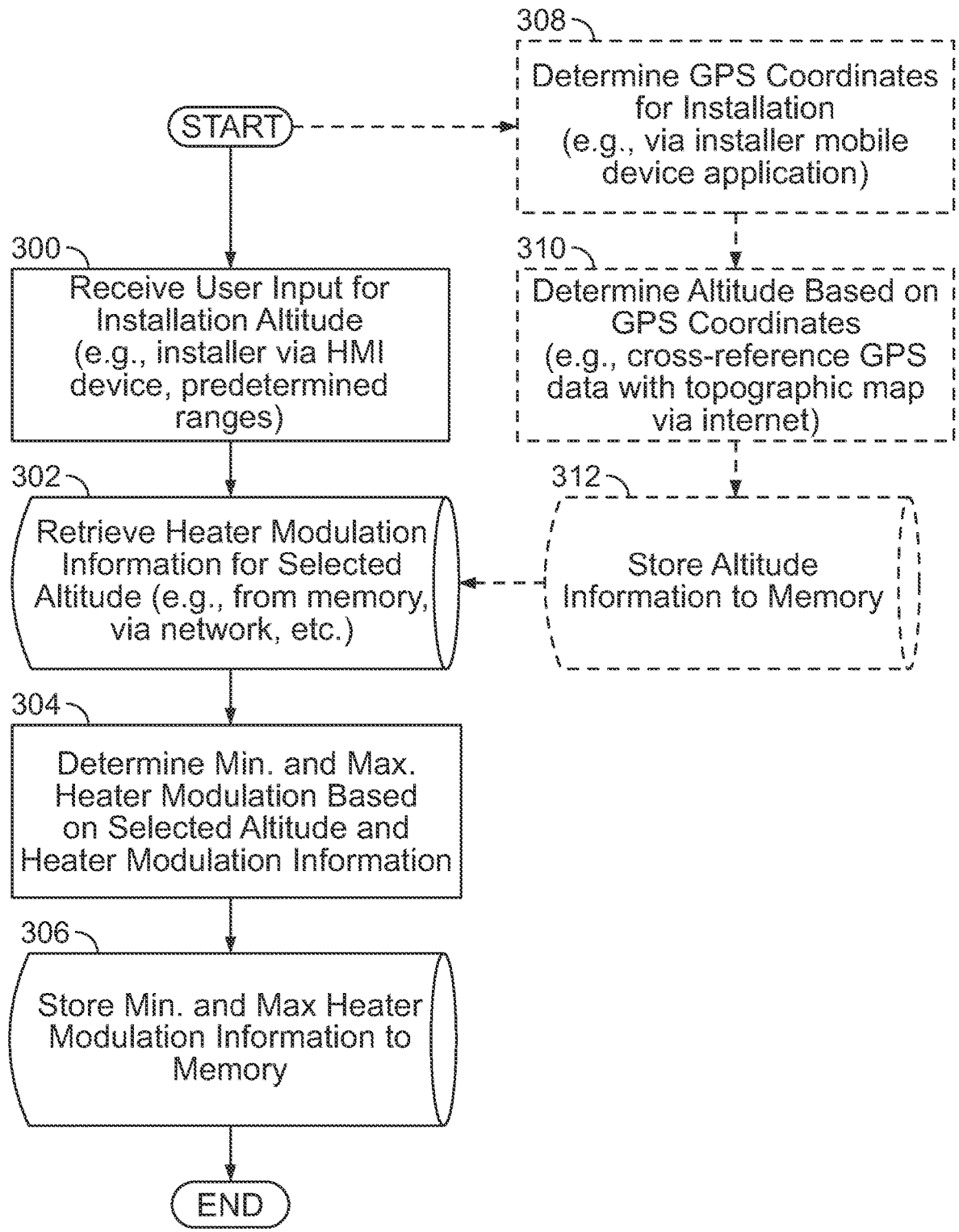
FIG. 14 is another flowchart illustrating process steps carried out according to embodiments of the present disclosure for modulating operation of a pool or spa heater based on an altitude of a pool or spa installation.

FIG. 14 is another flowchart illustrating process steps carried out by the system 10 of the present disclosure for optimizing the modulation rate of the heater 14 based on the altitude pool or spa installation. The process described in connection with FIG. 14 can be utilized where a negative regulation system of a pool or spa heater does not provide for full modulation range adjustments (e.g., as determined by agency testing). An installer can select the altitude of the pool or spa installation from a list of predetermined ranges displayed to the installer and the system 10 can use this information to set minimum and maximum modulation rates as a function of the selected altitude. According to some embodiments of the present disclosure, the altitude selection can be provided by an application on a mobile device, or the system could determine the altitude of the pool or spa installation based on GPS coordinates.

In step 300, the system 10 receives user input (e.g., via an HMI device, mobile phone application, or Internet portal) for the altitude of the pool or spa installation. For example, an installer could select the altitude from a list of predetermined altitude ranges displayed on a mobile device in communication with the system 10. In step 302, the system 10 retrieves heater modulation information (e.g., from the memory or via a network or data connection to an external source) for the selected altitude. In step 304, the system 10 determines the minimum and maximum heater modulation rates based on the selected altitude and the heater modulation information retrieved by the system 10 in step 302. In step 306, the system 10 stores the minimum and maximum heater modulations determined in step 304 to memory and then the process ends.

Optionally, in step 308, the system 10 can determine the (GPS) coordinates of the pool or spa installation (e.g., via an installer mobile device application or via an IP address geolocation service). In step 310, the system 10 determines the altitude of the pool or spa installation based on the (GPS) coordinates determined by the system 10 in step 308 (e.g., by cross-referencing the GPS or other location data with a topographic map stored in memory or accessed via the Internet). In step 312, the system 10 can store the altitude information of the pool or spa installation to memory for later retrieval and use in step 302. According to other embodiments of the present disclosure, the heater 14 can be provided with a pressure switch for measuring the current atmospheric pressure, which information can be utilized to determine the altitude of the heater 14 and provide this altitude information to the system 10 for use as described above.

Figure 15:
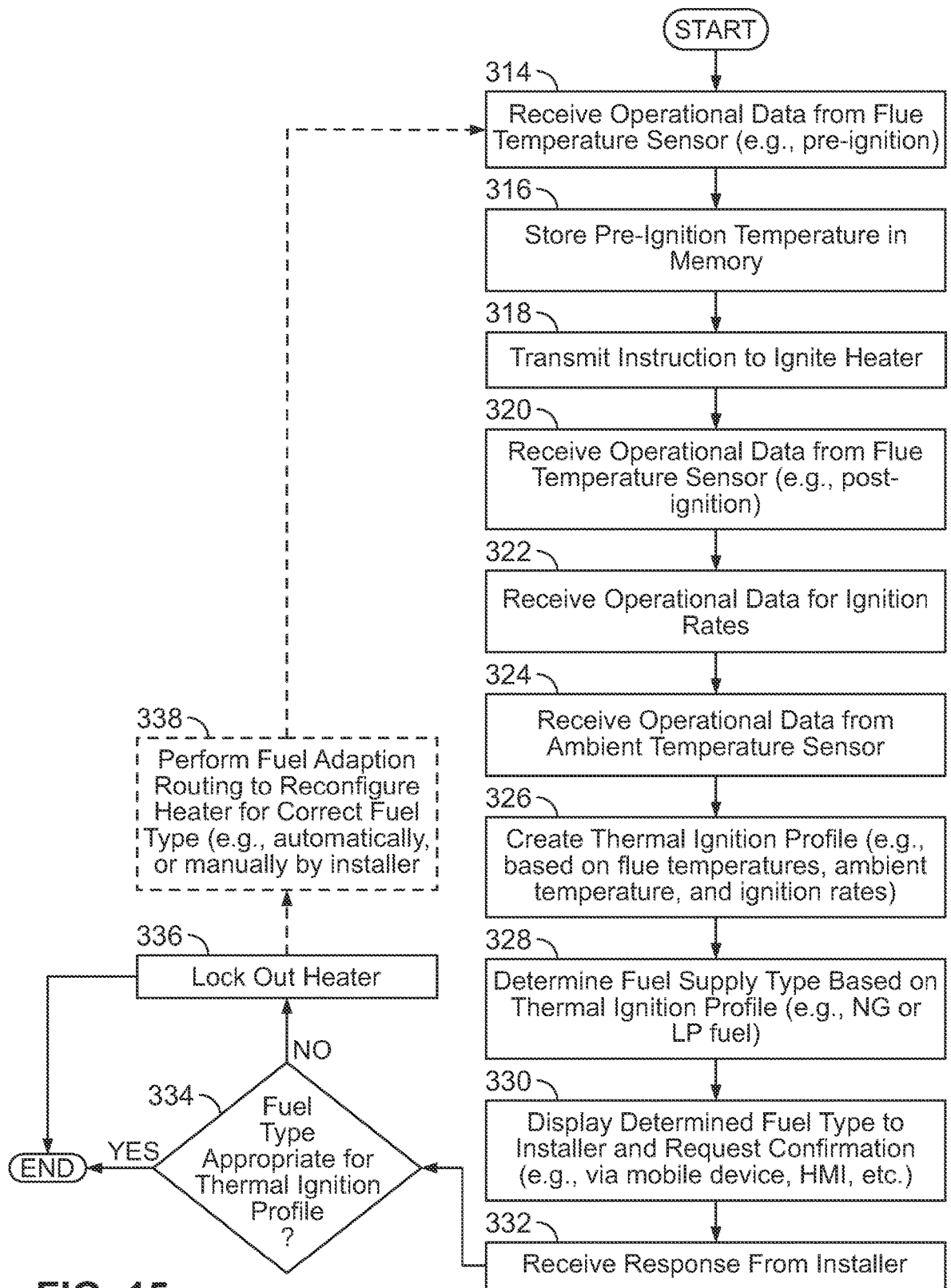
FIG. 15 is another flowchart illustrating process steps carried out according to embodiments of the present disclosure for operation of a pool or spa heater based on an automatic identification of a pool or spa heater fuel supply type.

FIG. 15 is another flowchart illustrating process steps carried out by the system 10 of the present disclosure for automatic fuel identification (e.g., NG or LP gas) and switching and heater modulation optimization based on the available heater fuel source. As described below, the process, uses the heater 14 flue temperature (pre- and post-ignition), ambient temperature of the pool or spa installation, and ignition rate(s) to create an ignition thermal profile, which is subsequently utilized by the system 10 to determine if the modulating heater is connected to an NG or LP gas fuel supply. The system 10 can use this information to alert the installer and to confirm fuel selection. According to some embodiments of the present disclosure, the system 10 can lock out the modulating heater if the ignition thermal profile is not appropriate for the fuel selection. Additionally, the modulating heater can include a fuel adaption routing feature, which can reconfigure the heater 14 (e.g., automatically or manually) for the correct fuel type. The fuel identification features can also be used to set heater modulation ranges that are appropriate for the fuel supply and altitude (e.g., as determined by the process described in connection with FIG. 14).

In step 314, the system 10 receives operational data from a flue temperature sensor of the modulating heater (e.g., at a time prior to ignition of the modulating heater). In step 316, the system 10 stores the pre-ignition temperature operational data in memory and then the process advances to step 318 where the system 10 transmits an instruction to ignite the modulating heater. According to some embodiments of the present disclosure, steps 314 and 316 can be performed by the manufacturer of the heater 14 during the manufacturing process and/or prior to installation of the heater 14 at the pool or spa location. Accordingly, the pre-ignition temperature operational data can be pre-programmed, or stored as a factory preset, in the memory of the heater 14 for subsequent retrieval and use by the system 10. In step 320, the system 10 (again) receives operational data from the flue temperature sensor (e.g., at a time following the ignition of the modulating heater). In step 322, the system 10 receives operational data related to ignition rates of the modulating heater. In step 324, the system 10 receives operational data from an ambient temperature sensor (e.g., positioned within the pool or spa installation area). In step 326, the system 10 creates a thermal ignition profile based on the heater 14 pre- and post-ignition flue temperatures, ambient temperature, and modulating heater ignition rates discussed in connection with steps 314-324.

In step 328, the system 10 determines the heater fuel supply type based on the thermal ignition profile. According to some embodiments, the system 10 can compare the thermal ignition profile to one or more known thermal ignition profiles (e.g., stored in database 16 or retrieved via the Internet) of different heater configurations and/or fuel supply types to determine a configuration of the heater 14 and the fuel supply type. For example, the system 10 can match the thermal ignition profile of the heater 14 to known thermal profiles of the heater 14 when provided with combinations of natural gas, liquefied petroleum gas, orifices configured for natural gas, orifices configured for liquefied petroleum gas, and the like in order to determine the present (e.g., orifice) configuration and fuel supply type of the heater 14. Similarly, the system 10 can compare the operational data for the ignition rates (e.g., received in step 322), including the number of missed ignitions, to one or more known ignition rates (e.g., stored in database 16 or retrieved via the Internet) for different heater configurations and/or fuel supply types to determine the configuration of the heater 14 and the fuel supply type. For example, the system 10 can match the number of missed ignitions of the heater 14 on startup to known missed ignition rates for the heater 14 when provided with combinations of natural gas, liquefied petroleum gas, orifices configured for natural gas, orifices configured for liquefied petroleum gas, and the like in order to determine the present configuration and fuel supply type of the heater 14.

In step 330, the system 10 displays the determined heater fuel supply type to an installer and requests confirmation that the heater fuel supply type determined in step 328 is correct. In step 332, the system 10 receives a response from the installer (e.g., via mobile device, HMI, web portal, etc.). In step 334, the system 10 determines if the determined heater fuel supply type, confirmed by the installer, is appropriate for the thermal ignition profile. If a positive determination is made, then the process ends. If a negative determination is made, then the process advances to step 336 where the system 10 locks out the modulating heater such that the heater 14 is not operable with a fuel type that is not appropriate for the thermal ignition profile determined by the system 10 in step 326 and then the process ends.

Optionally, in step 338, the system 10 can perform a fuel adaptation routing function to reconfigure the modulating heater for the correct fuel supply type and then the process can return to step 314.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A modulating heater system for a pool or spa, comprising:
 a pool or spa heater in fluidic communication with water of a pool or spa, the heater capable of variably modulating energy output thereof to heat the water of the pool or spa; and
 a controller communicatively coupled to the pool or spa heater, the controller configured to:
  determine a predicted load based on a previous load, a current ambient temperature, a current water temperature, and an estimated pool or spa size;
  determine a temperature overshoot setpoint for a mode of operation;
  establish a target water temperature setpoint for the pool or spa water for the mode of operation;
  receive a current water temperature of the pool or spa water from a temperature sensor;
  determine if the temperature overshoot setpoint for the mode of operation plus the target water temperature setpoint for the mode of operation is greater than the current water temperature;
  determine an error value based on the temperature overshoot setpoint for the mode of operation, the target water temperature setpoint for the mode of operation, and the current water temperature, where the error value is determined as the temperature overshoot setpoint plus the target water temperature setpoint minus the current water temperature;
  determine if the error value is less than a target value for the mode of operation;
  determine a first modulation rate for the pool or spa heater for the mode of operation if the error value is determined to be less than the target value, the first modulation rate being determined based at least on the mode of operation;
  determine a second modulation rate for the pool or spa heater for the mode of operation if the error value is determined to be greater than the target value, the second modulation rate being a maximum modulation rate determined based on a maximum output of the pool or spa heater, an available fuel supply, and the mode of operation; and
  control the pool or spa heater to operate at one of the first modulation rate and the second modulation rate.

\* \* \* \* \*